United States Patent
Al-Shahri et al.

(10) Patent No.: US 12,428,957 B2
(45) Date of Patent: *Sep. 30, 2025

(54) SYSTEMS AND METHODS FOR ESTIMATING WELL PARAMETERS AND DRILLING WELLS

(71) Applicant: Saudi Arabian Oil Company, Dhahran (SA)

(72) Inventors: Ali M. Al-Shahri, Doha (SA); Aidah G. Zahrani, Dammam (SA); Mohammed A. Shahri, Dhahran (SA); Hasan A. Nooruddin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,465

(22) Filed: May 8, 2024

(65) Prior Publication Data
US 2024/0287897 A1    Aug. 29, 2024

Related U.S. Application Data

(63) Continuation of application No. 18/467,152, filed on Sep. 14, 2023, which is a continuation of application
(Continued)

(51) Int. Cl.
*E21B 49/00*     (2006.01)
*E21B 44/00*     (2006.01)
(Continued)

(52) U.S. Cl.
CPC ............ *E21B 49/003* (2013.01); *E21B 44/00* (2013.01); *E21B 47/09* (2013.01); *E21B 49/005* (2013.01); *G06Q 50/02* (2013.01)

(58) Field of Classification Search
CPC ...... E21B 49/003; E21B 49/005; E21B 44/00; E21B 47/09; G06Q 50/02
See application file for complete search history.

(56) References Cited

U.S. PATENT DOCUMENTS

| | | |
|---|---|---|
| 6,282,452 B1 | 8/2001 | DeGuzman et al. |
| 6,612,382 B2 | 9/2003 | King |
| (Continued) | | |

FOREIGN PATENT DOCUMENTS

| | | |
|---|---|---|
| AU | 2016330207 B2 | 5/2022 |
| CA | 2731235 A1 | 1/2010 |
| (Continued) | | |

OTHER PUBLICATIONS

Al Gharbi, "Drilling rig schedule optimiation", Master's thesis, King Fahd University of Petroleum and Minerals, 2011.
(Continued)

*Primary Examiner* — Rehana Perveen
*Assistant Examiner* — Nupur Debnath
(74) *Attorney, Agent, or Firm* — DINSMORE & SHOHL LLP

(57) ABSTRACT

Systems and methods of estimating well parameters are disclosed. In one embodiment, a method of estimating well parameters includes receiving a plurality of wells, each well defined by a plurality of well attributes, receiving a plurality of historic wells, each historic well of the plurality of historic wells defined by a plurality of historic well attributes, and comparing the plurality of well attributes of the plurality of wells with the plurality of historic well attributes of the plurality of historic wells. The method further includes selecting one or more matched historic wells based at least in part on a similarity between the plurality of well attributes for an individual well with the plurality of historic well attributes of the one or more matched historic wells,
(Continued)

and calculating one or more well parameters based at least in part on the one or more matched historic wells.

20 Claims, 16 Drawing Sheets

Related U.S. Application Data

No. 17/074,735, filed on Oct. 20, 2020, now Pat. No. 11,867,054.

(60) Provisional application No. 63/022,914, filed on May 11, 2020.

(51) Int. Cl.
*E21B 47/09* (2012.01)
*G06Q 50/02* (2024.01)

(56) References Cited

U.S. PATENT DOCUMENTS

| | | | |
|---|---|---|---|
| 6,750,864 | B1 | 6/2004 | Anwar |
| 7,478,024 | B2 | 1/2009 | Gurpinar et al. |
| 7,548,873 | B2 | 6/2009 | Veeningen et al. |
| 7,778,859 | B2 | 8/2010 | Bouzas et al. |
| 9,068,432 | B2 | 6/2015 | Chapman |
| 9,183,182 | B2 | 11/2015 | Trainor-Guitton et al. |
| 9,460,403 | B2 | 10/2016 | Temizel |
| 9,703,006 | B2 | 7/2017 | Stern et al. |
| 10,100,619 | B2 | 10/2018 | Ranjan et al. |
| 10,190,395 | B2 | 1/2019 | Sayarpour |
| 10,233,728 | B2 | 3/2019 | Kristjansson et al. |
| 10,364,662 | B1 | 7/2019 | Basu et al. |
| 10,410,298 | B1 | 9/2019 | Basu et al. |
| 10,605,054 | B2 | 3/2020 | Klenner et al. |
| 10,851,636 | B1 | 12/2020 | Basu et al. |
| 11,867,054 | B2 | 1/2024 | Al-Shahri et al. |
| 2004/0220790 | A1 | 11/2004 | Cullick et al. |
| 2009/0132458 | A1 | 5/2009 | Edwards et al. |
| 2010/0325075 | A1 | 12/2010 | Goel et al. |
| 2012/0284670 | A1 | 11/2012 | Kashik et al. |
| 2014/0116776 | A1 | 5/2014 | Marx et al. |
| 2015/0278407 | A1* | 10/2015 | Vennelakanti .......... E21B 43/00 703/7 |
| 2015/0317589 | A1 | 11/2015 | Anderson et al. |
| 2015/0331971 | A1 | 11/2015 | Scollard et al. |
| 2016/0358271 | A1 | 12/2016 | Ortiz et al. |
| 2017/0068226 | A1 | 3/2017 | Wasserkrug et al. |
| 2017/0328181 | A1 | 11/2017 | Kristjansson |
| 2018/0010437 | A1 | 1/2018 | Reid et al. |
| 2018/0107952 | A1 | 4/2018 | Zhou et al. |
| 2018/0165590 | A1 | 6/2018 | Vlassis et al. |
| 2019/0043141 | A1 | 2/2019 | Lundh |
| 2019/0138963 | A1 | 5/2019 | El Saban et al. |
| 2019/0179873 | A1 | 6/2019 | Schirrmann et al. |
| 2019/0292908 | A1 | 9/2019 | Karimi Vajargah et al. |
| 2019/0325331 | A1 | 10/2019 | Benhallam et al. |
| 2020/0011158 | A1 | 1/2020 | Xu et al. |
| 2020/0040719 | A1 | 2/2020 | Maniar et al. |
| 2020/0063546 | A1 | 2/2020 | Weideman et al. |
| 2020/0157887 | A1 | 5/2020 | Alonso et al. |
| 2020/0302293 | A1 | 9/2020 | Liu et al. |
| 2021/0150440 | A1 | 5/2021 | Pang et al. |
| 2021/0302612 | A1* | 9/2021 | Venkatakrishnan ... G06Q 50/02 |

FOREIGN PATENT DOCUMENTS

| | | |
|---|---|---|
| CA | 2499303 C | 5/2024 |
| CN | 102930345 A | 2/2013 |
| CN | 109583675 A | 4/2019 |
| CN | 110020495 A | 7/2019 |
| CN | 110633850 A | 12/2019 |
| EP | 2944757 A1 | 11/2015 |
| EP | 3246858 A1 | 11/2017 |
| RU | 2692369 C1 | 6/2019 |
| WO | 2009007965 A2 | 1/2009 |
| WO | 2016140665 A1 | 9/2016 |
| WO | 2017058089 A1 | 4/2017 |
| WO | 2017171576 A1 | 10/2017 |
| WO | 2019118656 A1 | 6/2019 |
| WO | 2019241458 A1 | 12/2019 |
| WO | 2020007016 A1 | 1/2020 |
| WO | 2020256738 A1 | 12/2020 |
| WO | 2021013322 A1 | 1/2021 |

OTHER PUBLICATIONS

Yin et al., "Drilling performance improvement in offshore batch wells based on rig state classification using machine learning", Journal of Petroleum Science and Engineering, vol. 192, 107306, 24 pp. 2020.
Strickland, "Practical Aspects of Reserve Determinations for Shale Gas", SPE International, SPE144357, 59 pp. 2011.
U.S. Office Action dated Mar. 29, 2022 pertaining to U.S. Appl. No. 17/098,693, filed Nov. 16, 2020, 48 pages.
International Search Report and Written Opinion dated May 31, 2021 pertaining to International Application No. PCT/US2021/021006 filed Mar. 5, 2021, 15 pages.
International Search Report and Written Opinion dated Jun. 11, 2021 pertaining to International application No. PCT/US2021/020392 filed Mar. 2, 2021, 21 pages.
Fernandez Perez et al., "Optimizing Workover Rig Fleet Sizing and Scheduling Using Deterministic and Stochastic Programming Models", Industrial & Engineering Chemistry Research, vol. 57, No. 22, pp. 7544-7554, Jun. 6, 2018.
Bassi et al., "Planning and scheduling a fleet of rigs using simulation-optimization", Computers & Industrial Engineering, vol. 63, No. 4, pp1074-1088, Dec. 1, 2012.
Hansen et al., "Variable neighbourhood search: methods and applications", 4OR; Quarterly Journal of the Belgian, French and Italian Operations Research Societies, Springer, Berlin, DE, vol. 6, No. 4, pp. 319-360, Nov. 8, 2008.
Creemers, S, "The Resource-constrained Project Scheduling Problem with Stochastic Activity Durations", 2014 IEEE International Conference on Industrial Engineering and Engineering Management, pp. 453-457, Dec. 9, 2014.
Chowdhury, "Optimizing rig move time and activity schedule using critical path analysis", Optimization and business Imp;rovement Studies in Upstream Oil and Gas Industry, Chapter 7, First Edition, pp. 137-166, Aug. 8, 2016.
Ribeiro, et al., "A branch-price-and-cut algorithm for the workover rig routing problem", Computers and Operations Research, vol. 39, No. 12, pp. 3305-3315, Dec. 31, 2012.
Owen, "Step Change in Operations Scheduling", Hart Energy, pp. 94-96, Jul. 29, 2019.
International Search Report and Written Opinion dated Jul. 21, 2021 pertaining to International Application No. PCT/US2021/030844 filed May 5, 2021, 13 pages.
Braga, "Field Drilling Data Cleaning and Preparation for Data Analytics Applications" Thesis, Louisiana State University, Jun. 2019.
"Chapter 7—Petroleum Economic Evaluation", Standard Handbook of Petroleum and Natural Gas Engineering. http://dx.doi.org/10.1016/B978-0-12-383846-9.00007-2, Nov. 12, 2015.
Consultancy Services, "Maximise Production from Reservoir Assets", Emerson Process Management, https://www.emerson.com/documents/automation/data-sheet-software-consultancy-data-sheet-2014-roxar-en-82068.pdf, Ma 21, 2020.
Irgens et al., "Use of Advanced Optimization Techniques to Manage a Complex Drilling Schedule", Society of Petroleum Engineers, SPE 110805, Nov. 11-14, 2007.
Kullawan, "Risk Based Cost and Duration Estimation of Well Operations", Thesis, University of Stravanger, Master of Science in Petroleum Engineering, Drilling and Well Technology, Jun. 4, 2011.
Wang et al., "New Dynamic Multi-factor Economic Limit Well Pattern Density Calculation Method Based on Single-Well Limit Control Reserves", Springer Nature Singapore Pte Ltd, 2020.

(56) References Cited

OTHER PUBLICATIONS

U.S. Office action dated Dec. 19, 2022 pertaining to U.S. Appl. No. 17/098,667, filed Nov. 16, 2020, 29 pages.
U.S. Office Action dated Oct. 29, 2021 pertaining to U.S. Appl. No. 17/098,667, filed Nov. 16, 2020, 20 pages.
Lamas, L. F. et al. "Optimization for drilling schedule of wells in the development of heavy oil reservoirs." Brazilian Journal of Petroleum and Gas 11.3 (2017). (Year: 2017).
Torrado, Ruben R. et al. "Optimal sequential drilling for hydrocarbon field development planning." Twenty-Ninth IAAI Conference. 2017. (Year: 2017).
Ahmad et al., "A Stochastic Approach Towards Travel Route Optimization and Recommendation Based on Users Constraints Using Markov Chain", IEEE Access 7, pp. 90760-90776, 2019.
Aleman, et al. "CS238/AA228 Final Project Report: Decision-Making in the Context of Unconventional Oil Well Drilling Operations." Stanford University—Energy and Resource Engineering Department, Aug. 15, 2019.
Chen et al., "Discovering Popular Routes from Trajectories", 2011 IEEE 27th International Conference on Data Engineering. IEEE, 2011.
Chen et al., "Learning points and routes to recommend trajectories", Proceedings of the 25th ACM International on Conference on Information and Knowledge Management, 2016.
Flager, "A method to optimize onshore drilling rig fleet size and schedule considering both reservoir management and operational objectives." Journal of Project Production Management 1, 2014.
Hasle et al., "Well Activity Scheduling—An Application of Constraint Reasoning", Artificial Intelligence in the Petroleum Industry: Symbolic and Computational Applications II, pp. 209-228, 1996.
Lund, "The value of flexibility in offshore oil field development projects", Dr. Ing. thesis, The Norwegian University of Science and Technology, Trondheim, 1997.
Lund, "Valuing Flexibility in Offshore Petroleum Projects", Annals of Operation Research 99, pp. 325-349, 2000.
Santos et al., "A Systematic Literature review for the rig scheduling problem: Classification and State-of-the-art", Computers and Chemical Enginnering, vol. 153, 107443, 2021.
Sobaszek et al., "Predictive Schedulign with Markov Chains and ARIMA Models", Applied Sciences, vol. 10, 6121, 2020.
Tarhan et al., "Stochastic Programming Apprach for the Planninf of Offshore Oil or Gas Field Infrastructure under Decision-Dependent Uncertainty", Ind. Eng. Chem. Res., vol. 48, pp. 3078-3097, 2009.
Tarhan et al., "Computational strategies for non-convex multistage MINLP Models with decision-dependent uncertainty and gradual uncertainty resolution", Ann Oper Res, vol. 203, pp. 141-166, 2013.
Tavallali et al., Optimal Drilling Planning by Considering the Subsurface Dynamics-Combing the Flexibilities of Modeling and a Reservoir Simulator, Industrial & Engineering Chemistry Research, vol. 57, pp. 16367-16378, 2018.
Todorv, "Non-Productive Time Reduction Using Heuristic Wellbore Hydraulics Modelling", Master Thesis, Diss. University of Leoben, 2017.
Wang et al., "Oil-gas reservoir lithofacies stochastic modeling based on one- to three-dimensional Markov chains", J. Cent. South Univ. Vol. 25, pp. 1399-1408, 2018.
Wang et al., "Efficient Optimization of Well-Drilling Sequence with Learned Heuristics", Society of Petroleum Engineers, SPE Journal 24.05, pp. 2111-2134, Oct. 2019.
Wei, "Well Production Prediction and Visualization Using Data Mining and Web GIS." Master of Science Thesis, vol. 87, University of Calgary Calgary, AB, 2016.
U.S. Final Office Action dated Jan. 31, 2024 pertaining to U.S. Appl. No. 17/098,667, filed Nov. 16, 2020, 20 pages.
U.S. Office Action dated May 25, 2022 pertaining to U.S. Appl. No. 17/098,667, filed Nov. 16, 2020, 26 pages.
U.S. Office Action dated Jul. 21, 2023 pertaining to U.S. Appl. No. 17/098,667, filed Nov. 16, 2020, 27 pages.
U.S. Office Action dated May 10, 2023 pertaining to U.S. Appl. No. 17/098,693, filed Nov. 16, 2020, 55 pages.
U.S. Office Action dated Mar. 29, 2022 pertaining to U.S. Appl. No. 17/098,693, filed Nov. 16, 2020, 27 pages.
U.S. Office Action dated Oct. 21, 2022 pertaining to U.S. Appl. No. 17/098,693, filed Nov. 16, 2020, 35 pages.
Saudi Arabian Second Examination Report, dated Mar. 12, 2024, received in corresponding Saudi Arabian Application No. 522441238, pp. 1-18.

* cited by examiner

300

---

MARKOV-CHAIN TRANSITION PROBABILITIES

Minimum MC transition probability: 10

Main variables used in classifying wells:

W_OFFSH_FLG | W_DRLG_FLUID_TYP_CD | DRLG_OP_TYP_CD | BI_NUM | DRLG_RIG_TYP_CD |

| Well Class # | 1  | OFF | GAS | NEW | 60 | DLG |
| Well Class # | 2  | OFF | GAS | REN | 60 | DLG |
| Well Class # | 3  | OFF | GAS | WO  | 60 | DLG |
| Well Class # | 4  | OFF | OIL | NEW | 60 | DLG |
| Well Class # | 5  | OFF | OIL | REN | 60 | DLG |
| Well Class # | 6  | OFF | OIL | WO  | 60 | DLG |
| Well Class # | 7  | ON  | GAS | NEW | 60 | DLG |
| Well Class # | 8  | ON  | GAS | REN | 60 | CT  |
| Well Class # | 9  | ON  | GAS | REN | 60 | DLG |
| Well Class # | 10 | ON  | GAS | WO  | 60 | DLG |
| Well Class # | 11 | ON  | OIL | NEW | 60 | DLGI |
| Well Class # | 12 | ON  | OIL | REN | 60 | DLG |
| Well Class # | 13 | ON  | OIL | WO  | 60 | DLG |

SIMULATION PARAMETERS

| | |
|---|---|
| Simulation start year: | 2020 |
| Simulation end year: | 2024 |
| Global multiplier to well cost: | 1 |
| Global multiplier to well drill time: | 1 |
| Max. No. of added Rigs in 2020: | 0 |
| Max. No. of added Rigs in 2021: | 13 |
| Max. No. of added Rigs in 2022: | 8 |
| Max. No. of added Rigs in 2023: | 10 |
| Max. No. of added Rigs in 2024: | 10 |
| Rig stopping month in gas wells: | 11 |
| Rig stopping day in gas wells: | 15 |
| Rig stopping month in oil wells: | 12 |
| Rig stopping day in oil wells: | 15 |
| Released rigs cutt-off month: | 7 |
| Released rigs cutt-off day : | 1 |

FIG. 12

SYSTEMS AND METHODS FOR ESTIMATING WELL PARAMETERS AND DRILLING WELLS

CROSS-REFERENCE TO RELATED APPLICATIONS

This application is a continuation of U.S. patent application Ser. No. 18/467,152 entitled "Systems and Methods for Estimating Well Parameters and Drilling Wells" filed on Sep. 14, 2023, which itself is a continuation application of U.S. patent application Ser. No. 17/074,735 filed on Oct. 20, 2020, now U.S. Pat. No. 11,867,054 granted Jan. 9, 2024, which claims the benefit of priority under 35 U.S.C. § 119 to U.S. Provisional Application No. 63/022,914 filed on May 11, 2020, each of which is hereby incorporated by reference in its entirety.

BACKGROUND

Oil and gas companies may annually update a business plan that is used for budgeting forecasts and resources allocation. The business plan may involve two steps. A first step is production of a development-drilling program. This step addresses the question of how many wells are needed in the subsequent years in short-term and long-term bases. A typical development-drilling program includes the number of wells needed and their attributes (e.g, vertical, horizontal, oil producer, gas producer, water injector, etc.). A second step involves identifying the resources required to execute and implement the development drilling program.

Under the first step, many computerized simulations are run to identify how to develop an oil or gas field. There is presently a gap between field development simulation output and economic evaluation. For example, one cannot estimate near-term, mid-term, and long term economic evaluations based on the many simulation outputs that may be run.

Under the second step, capital expenditure by the oil and gas company is estimated for future years in short-term and long-term bases and is updated annually. For reliable budgeting forecasts and resource allocation, a detailed drilling schedule may be generated. A typical drilling schedule will contain forecasts about the start of drilling of every well, the completion of drilling, and the name and type of the drilling rigs. These forecasts have to take many factors into consideration, such as the location of the well (e.g., is it in the onshore or the offshore), the type of the well (e.g., horizontal, vertical, deviated), and other parameters. The generation of drilling schedules is done manually, and it may take hundreds of man-hours to pour over well and rig parameters to optimally match rigs to wells. Thus, significant time and costs are put into the generation of drilling schedules.

SUMMARY

Embodiments of the present disclosure are directed to systems and methods for calculating drill time and cost estimates for prospective wells of a business plan. Historic data corresponding to well attributes from historic wells are analyzed. Particularly, historic wells are automatically scanned to search for historic wells that match the attributes for the prospective wells in the development plan. Then, for each prospective well in the business plan, a group of similar historic wells are identified. The identified group of historic wells is used to calculate well parameters that may be used to perform downstream processes, such as calculating drilling schedules and budget forecasts.

In one embodiment, a method of estimating well parameters includes receiving, by one or more processors, a plurality of wells, each well of the plurality of wells defined by a plurality of well attributes, receiving, by the one or more processors, a plurality of historic wells, each historic well of the plurality of historic wells defined by a plurality of historic well attributes, and comparing, by the one or more processors, the plurality of well attributes of the plurality of wells with the plurality of historic well attributes of the plurality of historic wells. The method further includes selecting, for each well of the plurality of wells, one or more matched historic wells based at least in part on a similarity between the plurality of well attributes for an individual well of the plurality of wells with the plurality of historic well attributes of the one or more matched historic wells, and calculating, for each well of the plurality of wells, one or more well parameters based at least in part on the one or more matched historic wells of the plurality of historic wells.

In another embodiment, a method of drilling wells includes receiving, by one or more processors, a plurality of wells, each well of the plurality of wells defined by a plurality of well attributes, receiving, by the one or more processors, a plurality of historic wells, each historic well of the plurality of historic wells defined by a plurality of historic well attributes, comparing, by the one or more processors, the plurality of well attributes of the plurality of wells with the plurality of historic well attributes of the plurality of historic wells, and selecting, for each well of the plurality of wells, one or more matched historic wells based at least in part on a similarity between the plurality of well attributes for an individual well of the plurality of wells with the plurality of historic well attributes of the one or more matched historic wells. The method further includes calculating, for each well of the plurality of wells, one or more well parameters based at least in part on the one or more matched historic wells of the plurality of historic wells, generating a drilling schedule for the plurality of wells based at least in part on the one or more well parameters for each well of the plurality of wells, and drilling the plurality of wells according to the drilling schedule.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE DRAWINGS

FIG. 8 illustrates information about a global Markov Chain model according to one or more embodiments described and illustrated herein;

FIG. 12 illustrates simulation parameters used in an example simulation according to one or more embodiments described and illustrated herein;

DETAILED DESCRIPTION OF THE DISCLOSURE

Figure 1:
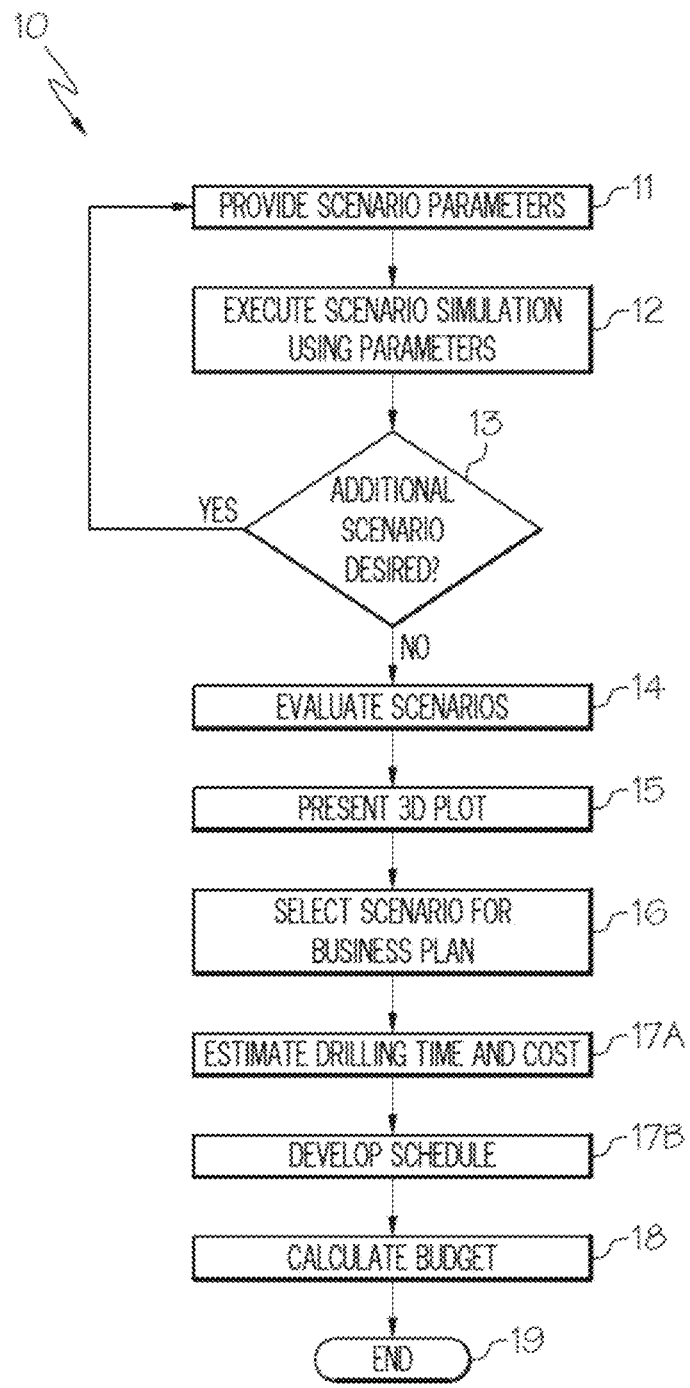
FIG. 1 illustrates an example method of economically evaluating a plurality of oil field simulation scenarios.

Embodiments of the present disclosure are directed to systems and methods that automate the process of generating drill time and cost estimates for prospective wells of a business plan based on historical data. Embodiments are based on matching well attributes that describe a well. Historic wells are automatically scanned for historic wells that match the well attributes for every single prospective well in the plan. Then, a group of similar wells to each well in the plan is identified. This group is used to calculate one or more of the following non-limiting well parameters for each prospective well: average drill time and cost, standard deviation, maximum and minimum for the drill time and cost, and covariance of cost and time.

Embodiments further include a matrix that quantifies the confident level in the estimates. In addition, embodiments account for the impact of drilling efficiency enhancement over time.

This information may then be utilized to develop drilling schedules and budget forecasts, for example.

Embodiments further provide systems and methods for evaluating oil and gas field simulation scenarios. Oil and gas field simulators simulate various aspects of the wells of an oil field. Such simulators are used to develop a business plan regarding how to develop an oil or gas field for the extraction of hydrocarbons. The business plan may include the plurality of prospective wells that are matched to historic wells as stated above.

However, there is presently a disconnect between the output of the simulator and economic considerations. Users cannot easily see the near-term, mid-term and short term economic impacts of an oil or gas field simulation output. Embodiments of the present disclosure solves the issue by providing an automated workflow to economically evaluate multiple development scenarios provided by field development simulations. For a systematic and standardized approach for scenario comparison, embodiments generate a three-dimensional matrix that is displayed as a three-dimensional plot covers capital cost as represented by well count, net present value (NPV), and cumulative production. This matrix provides the decision maker with a clear scenario comparison in one glance. These three dimensions, respectively, represents the near-term, mid-term and the long-term of a development strategy. At the well level, a comparison is made based on NPV and internal rate of return (IRR). At the field level, the three-dimensional matrix provides a comparison based on cumulative production.

Embodiments further provide systems and methods for generation of long-term drilling schedules for oil and gas business planning. Generally, embodiments may model the movement of rigs between wells while honoring operational and logistical restrictions to mimic reality. The machine-learning algorithm of the present disclosure learns from historic drilling schedules, and extracts rules and applies them for futures wells. Use of the Markov Chain models described herein enable embodiments to automatically generate drilling schedules with significantly reduced time and significantly reduced computer processing power as compared with traditional methods.

Various embodiments of automatically generating drilling time and cost estimates of prospective wells are described in detail below.

To calculate the drilling time and cost estimates of prospective wells, first a business plan including the prospective wells is created. Any known or yet-to-be-developed methods of generating a business plan including the prospective wells may be utilized. In some embodiments, the prospective wells of the business plan are known a priori. In some embodiments, the computerized methods that generate the business plan, generate the drilling time and cost estimates, and generate the drilling schedule and budget forecasts are provided in one system that automates all tasks. In other embodiments, the generation of the business plan, the generation of the drilling time and cost estimates, and the generation of the drilling schedule and budget forecasts are performed discretely by different systems.

A non-limiting example of evaluating oil field simulation scenarios to develop a business plan is described below.

Referring now to FIG. 1, an example method of evaluating oil field simulation scenarios is graphically illustrated by flowchart 10. In embodiments of the present disclosure multiple computerized simulation scenario outputs corresponding to multiple oil field scenarios are generated and compared. As used herein, each oil field scenario is represented by a computerized simulation scenario output. Scenario parameters are used to define each oil field scenario. Such scenario parameters are received by a computing device at block 11 of the flowchart 10 illustrated by FIG. 1. Scenario parameters define various aspects of the wells used to drill the oil field. As used herein, the phrase "oil field" also encompasses "gas field," such as, without limitation, a natural gas field. Scenario parameters may include the type of well (e.g., horizontal well, vertical well, multiple hole horizontal well or vertical well, single hole horizontal well or vertical well, and the like), well locations, well depths, well completion layer, well completion type, well rate restrictions or relaxation using artificial lift method, and any additional parameters that can be considered for field development. Embodiments are not limited by the type or number of scenario parameters that are used to define the oil field scenarios.

Next, at block 12, the oil field scenario defined by the scenario parameters is simulated by one or more simulators. Any known or yet-to-be-defiled oil and gas simulator may be used to simulate fluid flow and the production of wells in the oil field. As a non-limiting example, the simulator may be the GigaPOWERS simulator developed by the Saudi Arabian Oil Company of Dhahran, Saudi Arabia. However, it should be understood that other oil and gas simulators may be utilized.

At block 13, it is decided if more scenarios are desired or if more scenarios are to be simulated. If so, the process moves back to block 12 where another scenario is simulated. It is to be understood that in other embodiments scenario parameters for multiple scenarios may be received all at once at block 11, and multiple scenarios may be currently simulated at block 12. Further, historical simulations performed in the past may be accessed and evaluated further in the process.

For consistency and workflow automation, the simulation output for each scenario should have a standardized output. Therefore, each scenario should honor the following features:
  scenario total production forecast (minimum of 50 years after the date of the last well to be drilled in the plan);
  production forecast for each well; and
  Well Type identification (e.g., horizontal well, vertical well, multiple hole horizontal well or vertical well, single hole horizontal well or vertical well, and the like).

Each of the above should be provided in a standardized format so the simulation outputs of the multiple scenarios may be compared. This is so that many simulations may be evaluated and compared against one another as described in more detail below. If the outputs of the simulations are in different formats, or they simulate different features, then they may not be able to be evaluated and compared with respect to each other. The above features are used to calculate the three-dimensional matrix, which is described below.

As stated above, embodiments of the present disclosure link the oil and gas reservoir simulation to economic evaluations. In embodiments, the following non-limiting economic parameters are used to perform the economic evaluations:
  discount rate;
  cost escalation rate; and
  standard period for investment economic evaluation.

The discount rate is the interest rate used to determine the present value of future cash flows in a discounted cash flow (DCF) analysis. The discount rate assists in determining if the future cash flows from a project or investment will be worth more than the capital outlay needed to fund the project or investment in the future. The cost escalation rate is defined as changes in the cost or price of goods or services in a given economy or over a period of time. The standard period for investment economic evaluation is the period of project life at which the future cash flows should be discounted at.

In addition, the drilling cost and operating cost for each well in the scenario may be calculated. In the example provided herein, a general assumption for the operating cost was considered as a certain percentage of the drilling cost assumed to be spent annually. The drilling cost estimates may be calculated by any method.

Based on the simulations and the economic parameters, the following economic measures calculated:
  scenario cumulative production;
  NPV at the scenario level;
  scenario total well count; and
  NPV and initial rate of return (IRR) at well level.

As used herein, "scenario level" means the simulation output regarding the entire oil or gas field comprising multiple wells. As used herein, "well level" means the simulation output regarding a single well of a particular scenario.

Embodiments provide an automated workflow that calculates the economic evaluation for multiple scenarios simultaneously. The automation is done by loading all the scenario outputs into a directory, which may be done prior to block 14 of FIG. 1. After all of the scenario parameters are provided at blocks 11-13 and are in a standardized format, the automation tool starts running at block 14. The automation tool makes all calculations for each scenario, and outputs the NPV and IRR for every single well in every scenario while also naming each well in each scenario. The IRR calculation is performed at the well level to rank wells based on their economic values, and it is an additional tool that supports decision making in addition to the three-dimensional matrix. The automation tool also calculates a cumulative production and a total well count for each scenario. The process is automated such that many scenarios can simultaneously be evaluated as needed.

Three Dimension Matrix for Scenario Comparison

For the multiple development scenarios that are simulated, a three-dimensional matrix that allows for quick and standardized comparison of multiple scenarios is calculated. The three-dimensional matrix is presented in a three-dimensional plot in a graphical user interface at block that has the following dimensions:
  NPV;
  cumulative production; and
  total well count.

Each dimension represents the comparison from a different prospective that vary in the time horizon. The NPV represents the economic value over a certain period of time which usually characterizes the mid-term (e.g, 30-50 year time horizon). On the other hand, the cumulative production represents the total produced volume of hydrocarbon over the prediction run or the life of the field which represent the long-term aspect (e.g., 100+ year time horizon). Finally, the total scenario well count represents the level activities required to maintain the target rate from the field. The well count can be considered to represent the shorter-term (e.g., 0-30 years) and it links the scenario to the relevant aspects such as level of employment and logistics which cannot be addressed in such assessment.

Figure 2:
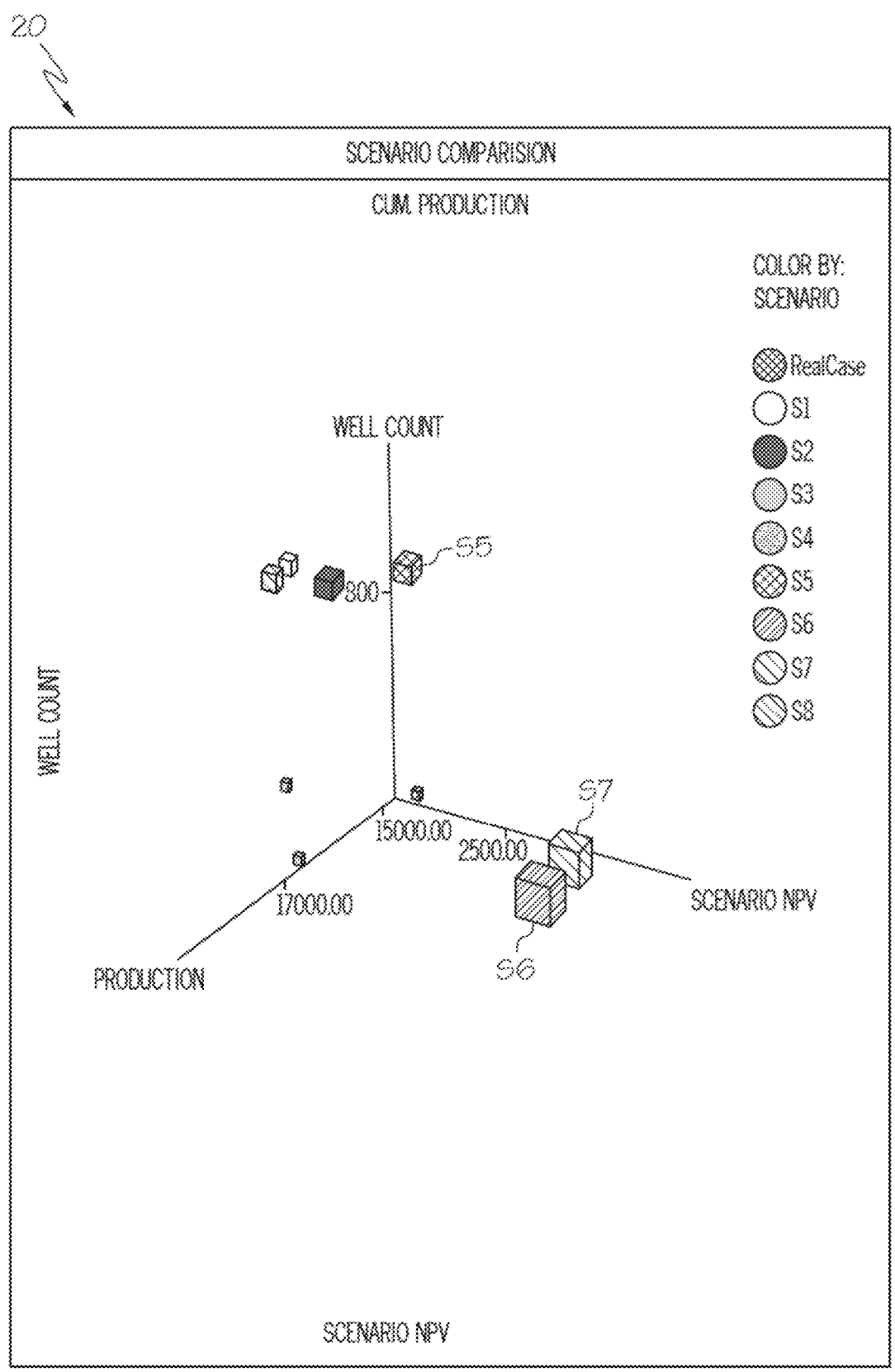
FIG. 2 illustrates an example three-dimensional plot that plots a plurality of oil field scenarios by well count, net present value, and cumulative production.

A non-limiting example of a three-dimensional plot 20 shown in a graphical user interface is illustrated in FIG. 2. In the example of FIG. 2, eight scenarios were assessed (scenarios S1-S8). However, it should be understood that any number of scenarios may be assessed.

The three-dimensional plot 20 provided in the graphical user interface allows a user to quickly view how scenarios compare with respect to near-term, mid-term, and long-term time horizons. Such an analysis was not possible before. In the illustrated example, the vertical axis is total well count. For this economic measurement, the higher on the total well count axis, the greater the near term costs because rigs and equipment will need to be secured to drill the total number of wells. Thus, scenarios appearing higher on this axis may not be as desirable as those appearing lower on the axis. For example, scenario S5 has a much higher total well count than scenarios S6 and S7 and thus may have higher short-term costs.

For the mid-term evaluation, scenarios appearing farther along the NPV axis have a higher NPV than those not appearing far along the NPV axis. Such scenarios appearing far along the NPV axis have a high NPV. In the example of FIG. 2, scenarios S6 and S7 have higher NPVs than scenario S5. Scenarios with high NPV have better mid-term economic prospects than those with low NPV.

For the long-term evaluation, scenarios appearing farther along the cumulative production axis have better long-term prospects than those not appearing far along the cumulative production axis. Scenarios having large potential cumulative production may be economically viable longer than those with smaller cumulative production. In the example of FIG. 2, scenario S6 has a greater predicted cumulative production than scenario S7. Thus, a user may select scenario S6 over scenario S7 for consideration as a future business plan.

In the illustrated embodiment, the scenarios are illustrated by a cube of various sizes. The volume of the cube may represent a fourth dimension (i.e., a fourth metric) in some embodiments. This fourth dimension may be established by the user and is not limited by the disclosure. It should be understood that the individual scenarios may be represented by shapes or icons other than cubes.

The three-dimensional plot allows a user to quickly evaluate multiple simulated scenarios according to three dimensions. Depending on the requirements of the business plan, the most desirable scenario provided by the simulation outputs may be the simulation that has the lowest well count, the highest NPV, and the highest cumulative production. However, this may not be the case for all business plans.

In some embodiments, a user may select a selected oil field scenario from the three-dimensional plot for further analysis (block 16 of FIG. 1). When the NPV and IRR are calculated for each well in a selected scenario, wells can then be sorted as shown in the example tornado plot of FIG. 3. This tornado plot demonstrates well ranking from the highest NPV to the lowest. Wells that yield low or negative NPV can easily be identified and adjusted in the simulation model to allow further optimization.

Figure 3:
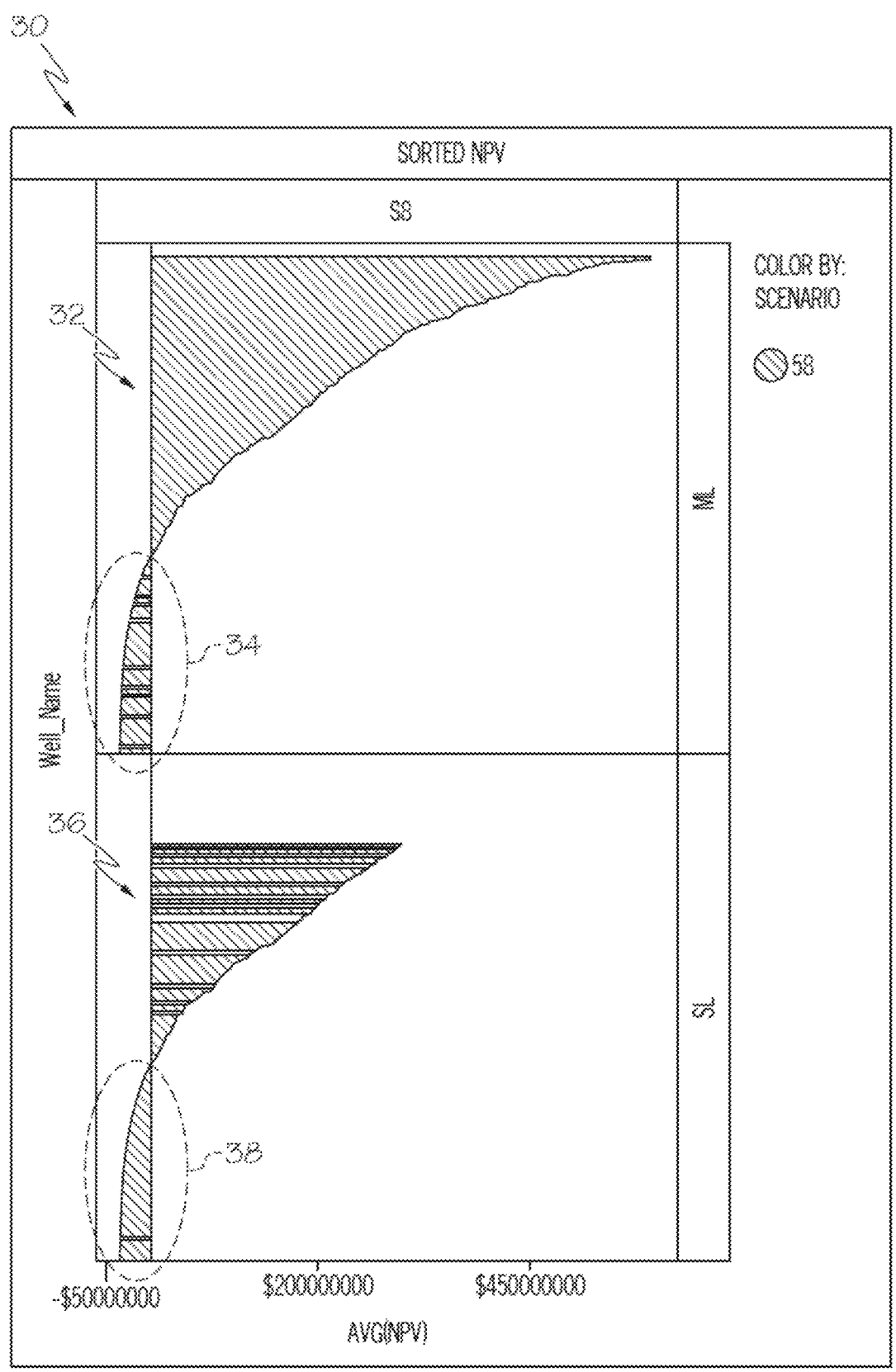
FIG. 3 illustrates an example tornado plot that ranks wells of a selected oil field scenario by net present value.

In the example of FIG. 3, single-hole wells and multiple-hole wells are separately ranked by NPV. There are multiple-hole wells with a positive NPV 32 and multiple-hole wells with a negative NPV 34. Similarly, there are single-hole wells with a positive NPV 36 and single-hole wells with a negative NPV 38. The wells with negative NPV may be selected for further investigation. There may be parameters associated with the wells and/or scenario that causes the wells to not be economically viable. Some parameters regarding these unproductive and/or non-economically viable wells may be updated by the user. An updated scenario using the updated parameters may be simulated again by the computerized simulation method at block 12. This updated scenario may then be added to the plurality of scenarios for evaluation, such as in the three-dimensional plot. In this manner, the graphical user interfaces of the embodiments of the disclosure may be used in a feedback loop to generate an optimal scenario used in a business plan.

Referring again to FIG. 1, a scenario that meets a user's requirements is selected as a scenario for use in developing a business plan at block 16. From the business plan, estimates for drilling time and costs are generated at block 17A. A drilling schedule may be determined at block 17B, and a budget forecast calculated from the drilling schedule at block 18. The process then ends at block 19, such as will the wells of the oil field being drilled in accordance with the drilling schedule.

After the business plan is established (either based at least in part on the process described above and illustrated by FIG. 1-3 or some other process(es)), estimated well parameters for each well in the business plan are generated (block 17A of FIG. 1). The estimated well parameters, which include drilling time and cost, may then be used to generate one or more drilling schedules and budget forecasts.

To estimate the well parameters for the prospective wells of the business plan, each prospective well is matched with one or more historic wells based on a plurality of well attributes. A data source storing historic well attributes of a plurality of historic wells is scanned to find historic wells having historic well attributes that match the prospective wells of the business plan. For example a first prospective well of the business plan may have a plurality of well attributes that match one or more historic well attributes of one or more historic wells. Information regarding the one or more matched historic wells are then used to calculate well parameters of the first prospective well, for example.

The well attributes are not limited by this disclosure. Embodiments may include the following non-limiting example well attributes (which are the same for the historic well attributes):

Fluid Type (Oil or Gas);
Shore Type (Onshore or Offshore);
Well Type (New, Re-entry or Workover);
Well Configuration (Vertical, Horizontal, Multilateral, etc.);
Well Objective (Producer, Injector, Observation, etc.);
Field Name; and
Reservoir Name.

The Fluid Type well attribute indicates whether the well is an oil well or a gas well. The Shore Type well attributes provides whether the well is an onshore well or an offshore well. The Well Type provides information regarding the type of well, such as, without limitation, a new well, a re-entry well, or a workover well. The Well Configuration provides information regarding the configuration of the well, such as, without limitation, a vertical well, a horizontal well, a multilateral well, and the like. The Well Objective indicates the objective of the well, such as, without limitation, a producer well, an injector well, an observation well, and the like. The Field Name attribute indicates the name of the field that the well resides. The Reservoir Name indicates the reservoir name in which the well resides.

As stated above, the plurality of well attributes of the plurality of prospective wells are compared against the plurality of historic well attributes of the plurality of historic wells. A matching process is utilized to effectuate the comparison of the historic attributes against the attributes of the prospective wells. An ideal historic well will match all of the well attributes of a corresponding prospective well. However, one-hundred percent matching may be unlikely. Thus, in embodiments, the matching process may try to match more important well attributes first before matching those attributes that are of lesser importance. The ranking of well attributes from most important to least important may be done heuristically and is not limited by this disclosure.

In a non-limiting example, the matching process includes decision tree logic that applies a decision tree. The most important well attributes are provided at one or more highest levels of the decision tree, and the least important well attributes are provided at one or more lowest levels of the decision tree. Thus, the well attributes are ranked from most important at the highest level (i.e., root level) to least important at the lowest level (i.e., leaves). The decision tree may be populated with the well attributes by a user in some embodiments. Therefore, the decision tree may be customizable.

Figure 4:
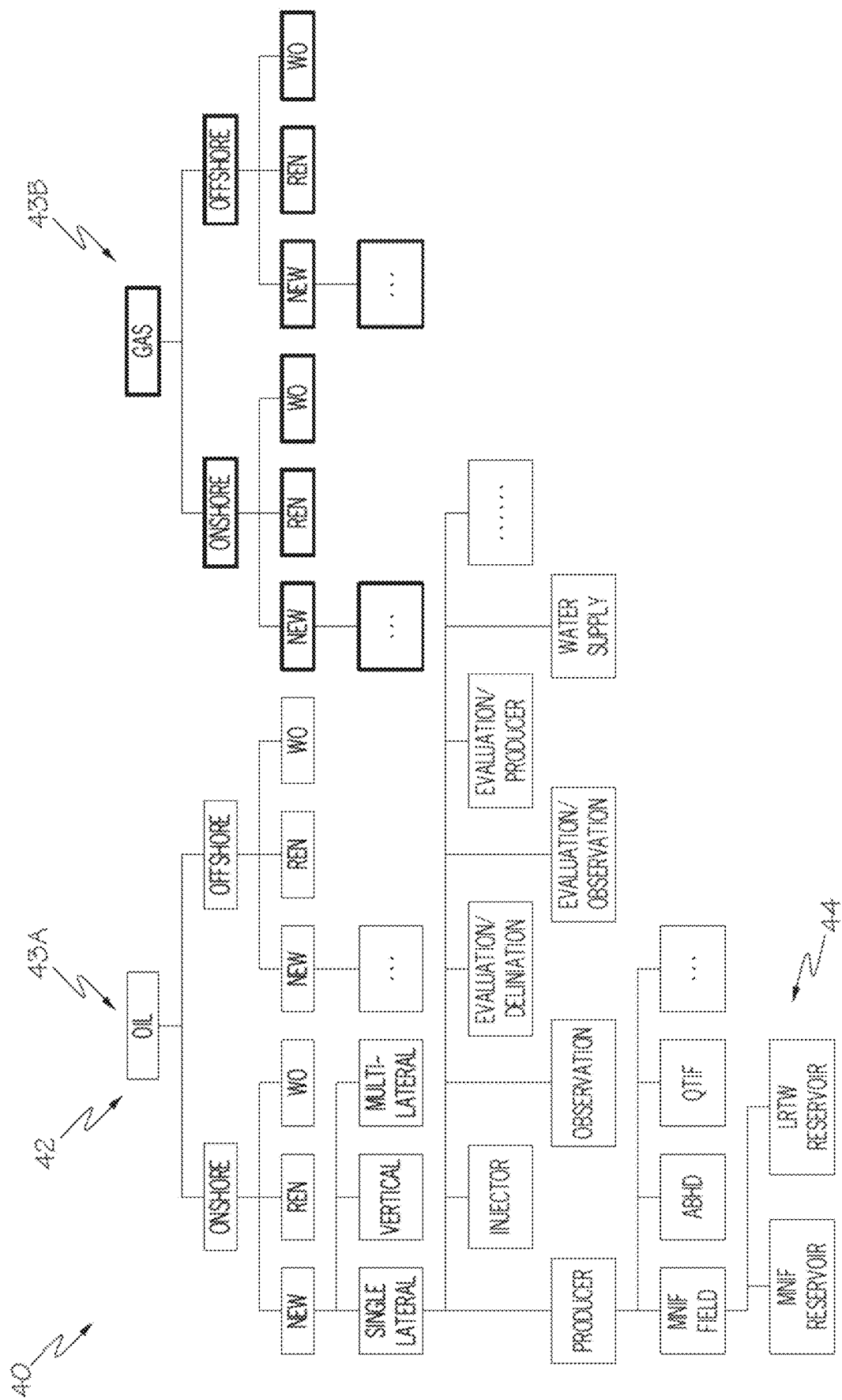
FIG. 4 illustrates an example decision tree for finding matched historic wells according to one or more embodiments described and illustrated herein.
Figure 5B:
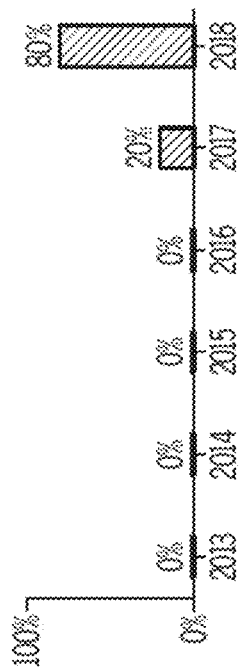
FIG. 5B illustrates another example weighted average scheme for weighting historic well data according to one or more embodiments described and illustrated herein.
Figure 5D:
FIG. 5D illustrates another example weighted average scheme for weighting historic well data according to one or more embodiments described and illustrated herein.
Figure 5A:
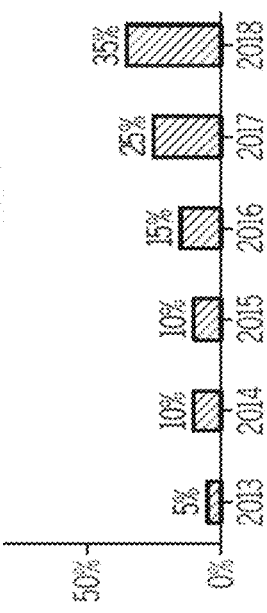
FIG. 5A illustrates an example weighted average scheme for weighting historic well data according to one or more embodiments described and illustrated herein.
Figure 5C:
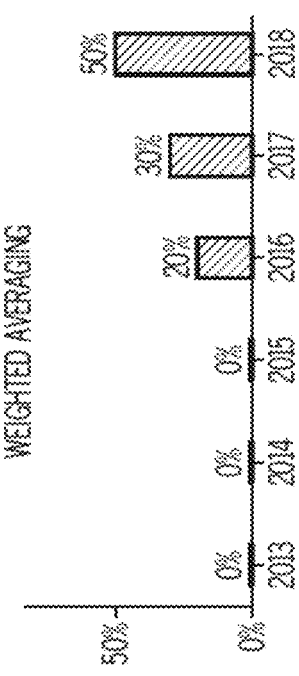
FIG. 5C illustrates another example weighted average scheme for weighting historic well data according to one or more embodiments described and illustrated herein.

A non-limiting example decision tree 40 is illustrated in FIG. 4. A highest level 42 of the decision tree 40 is set to the Fluid Type, which may be oil 43A or gas 43B. Beneath oil 43A and gas 43B are additional levels of the decision tree of descending importance. The lowest level 44 of the example decision tree 40 is Reservoir Name.

The process uses the decision tree logic to eliminate attributes in a sequential order starting from the bottom of the decision tree to the top of the decision tree. A group of one or more historic wells are matched with each prospective well of the business plan. Thus, each prospective well has a group of similar historic wells associated therewith.

The identified group of matched historic wells is used to calculate well parameters for each well in the business plan. As described in more detail below, the well parameters for the plurality of wells in the business plan are used to generate a drilling schedule and budget forecasts. Non-limiting example well parameters include:
- average drill time and cost;
- standard deviation;
- maximum and minimum of cost and drill time; and
- covariance of cost and time.

It should be understood that other parameters may also be calculated.

The calculated parameters are then used in the next stages of the planning process, which may include a deterministic planning approach and/or a stochastic planning approach. In the deterministic planning approach, the average drill time and the average cost for each well are used as the estimated drill time and the estimated cost, respectively, and are provided to a downstream process for generating a drilling schedule and a budget forecast, such as the example process for generating a drilling schedule and budget forecast as described below.

In the stochastic planning approach to scheduling and budget forecasting, averaging the time and cost is done with the well parameters of the matched historic wells, and then the standard deviation of the data (i.e., drill time standard deviation and cost standard deviation) is calculated to measure the confidence level. Minimum and maximum drill time and cost, and covariance of drill time and cost are calculated to be used in the stochastic modeling approach. The covariance is calculated by relating the time taken to drill a well and its cost together (higher operation cost is mostly a result of longer operation time). Therefore, using the covariance identifies the cloud shape which represents the time and cost data relationship. Below is an example, non-limiting covariance formula for a population of two parameters, such as drill time (X) and cost (Y):

$$\mathrm{Cov}(X, Y) = \frac{\sum (Xi - \overline{X})(Yj - \overline{Y})}{n}$$

In some cases, future wells are planned in new fields that have only few wells in the history. In other cases, new types of wells are planned to be drilled in specific areas. In such situations, the future wells may not have enough historical data that fully match the well attributes. Therefore, the confidence level of the estimates should somehow be quantified.

In embodiments of the present disclosure, a two dimensional confidence matrix is utilized to determine a confidence level of the estimated well parameters. The confidence matrix is based on the number of matched historic wells and the number of matched well attributes. The table below shows the confidence matrix values of a non-limiting example matrix:

TABLE 1

| # of attributes | # of matched wells | | | | |
|---|---|---|---|---|---|
| | 1 | 2 | 3 | 4 | 5+ |
| 2 | 0% | 0% | 0% | 0% | 0% |
| 3 | 5% | 5% | 5% | 5% | 15% |
| 4 | 16% | 21% | 26% | 31% | 36% |
| 5 | 28% | 35% | 43% | 50% | 58% |
| 6 | 39% | 49% | 59% | 69% | 79% |
| 7 | 50% | 63% | 75% | 88% | 100% |

These confidence values may be determined heuristically, for example. However, any method may be used to determine the confidence values of the confidence matrix.

The confidence matrix may be used downstream when calculating the drilling schedule and/or budget forecasts in any manner.

It is noted that by looking into historic drilling performance, there is a clear indication that the cost and drill time are following a continuous improvement trend. This is supported by improved drilling practices, procedures and improved drilling crew learning curve. In the calculation of the estimated well parameters, this continuous improvement may be accounted for in some embodiments. Therefore, higher weight can be given to the more recent years over the older ones when calculating the estimated well parameters. Thus, the embodiments may account for performance trends over time which are mainly a reflection of drilling efficiency and experience factor.

Weighted averaging may be done by assigning a higher weight to the more recently drilled wells. Multiple examples of different weighted averaging schemes are demonstrated in FIGS. 5A-5D. It should be understood that any weighted averaging scheme may be employed. It should also be understood that in other embodiments, no weighted averaging may be used.

Referring once again to FIG. 1, embodiments of the present disclosure are also directed to systems and methods for generation of long-term drilling schedules for oil and gas business planning (blocks 17 and 18). Generally, embodiments model the movement of rigs between wells while honoring operational and logistical restrictions to mimic reality. The machine-learning algorithm of the present disclosure learns from historic drilling schedules, and extracts rules and applies them for futures wells. Use of the Markov Chain models described herein enable embodiments to automatically generate drilling schedules with significantly reduced time and significantly reduced computer processing power as compared with traditional methods.

1. Learning Rig Capabilities

First, rig capabilities are learned from historical drilling activities. Rig capabilities refer to the various rig parameters, such as, without limitation, shore type (e.g, onshore or offshore), fluid type (e.g, whether a rig can be assigned to oil wells, water wells, or gas wells, or any combinations of these wells), and rig horsepower (e.g., rigs with relatively low horsepower may not be able to drill horizontal wells). Contracting conditions may also be considered as part of rig capabilities because they influence the assignment of rigs to certain wells. Contracting conditions refer to specific contracts that limit the drilling for a given rig(s) to certain type of well(s) in certain field(s).

In embodiments, rig capabilities and movements are learned by building a Markov Chain (MC) model that tracks the movement of each rig in the history and analyses the type of wells drilled in the process. From this, the algorithm computes transition probabilities that control the assignment of rigs to future wells in prediction. Historic rig data is accessed from one or more databases. This historic rig data includes information about the movements of a plurality of rigs, such as the types of wells and under what conditions the rigs moved from well to well. Historical well data is also accessed to gain an understanding of the well parameters of the wells that the rigs drilled in the past. The historic rig data and the historical well data is used to learn the rig capabilities and movements to further predict the movement of rigs to future wells in the business plan.

Figure 6:
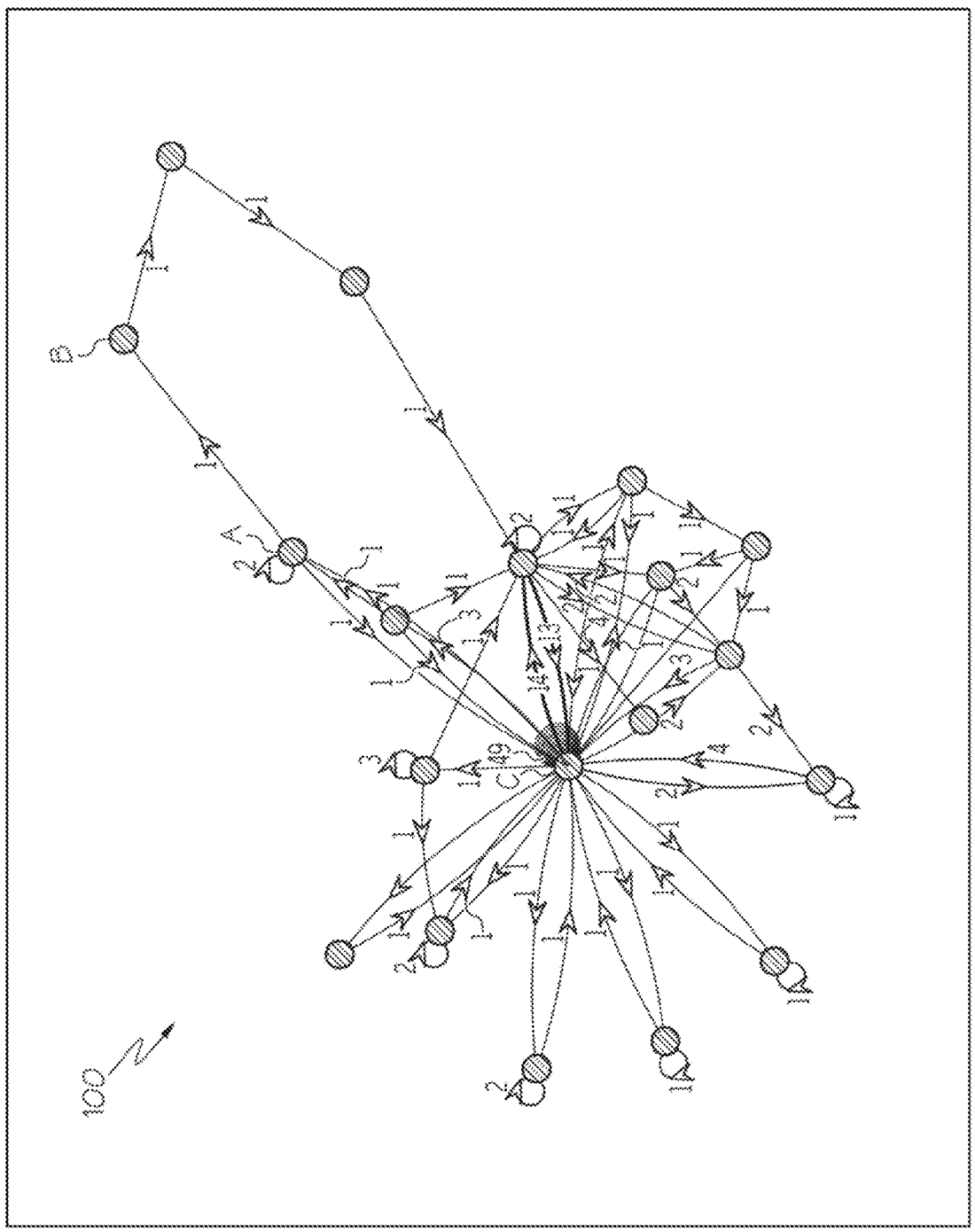
FIG. 6 graphically illustrates a Markov Chain model according to one or more embodiments described and illustrated herein.

FIG. 6 depicts a non-limiting example MC Model 100 for a single rig indicating the number of visits to each event of a well in history. In FIG. 6, the type of wells drilled represent the state, and the number on arrows marks the number of times a rig moves between each state and thus defines the links between states. The MC states may be defined by the user and may contain information about the field, the fluid type (oil or gas), location (onshore or offshore), drilling operation (New well, Re-entry or Workover) and well type (vertical, horizontal, multilateral, etc.).

In the example of FIG. 6, the particular rig returned to wells of a type as defined by state A two times, moved to a well of a type as indicated by state B from a well of a type as defined by state A one time, and moved to a well of a type as indicated by state C from a well of a type as defined by state A. As stated above, the states (and thus the types of wells) are definable by the user. The MC models for the individual rigs are generated using the historic rig data and the historical well data.

There may be hundreds of rigs required to effectuate the business plan, with each rig having its own MC model. For these MC models to be used in prediction, embodiments combine all individual MC models for all rigs into a single MC model. The advantage of such approach is realized through increasing the number of data points and obtaining more representative transition probabilities. In this approach, all rigs may share the same MC model.

Figure 7:
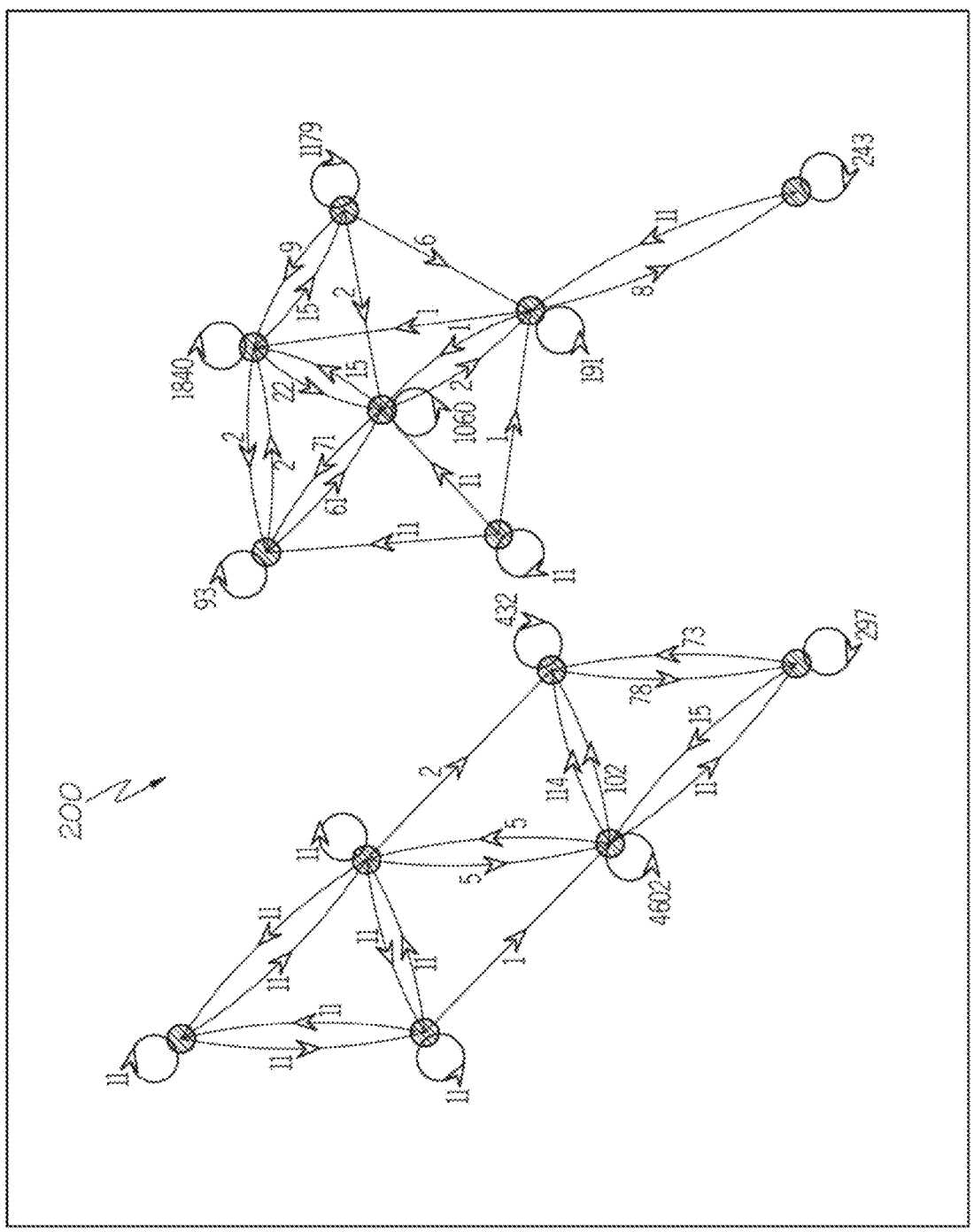
FIG. 7 graphically illustrates a global Markov Chain model according to one or more embodiments described and illustrated herein.

FIG. 7 illustrates an example global MC model 200 that was built from individual rig MC models, and used in a simulation as described in more detail below. The circles (i.e., the states) indicate well classes, and the number of the class represents a well class with a unique set of well attributes as defined by the user. The well classes of the present example are defined in FIG. 8. The arrows indicate the connection between the different well classes, and the number on the directed arrows indicates the number of times a rig moves between the different classes. The data is based on the movements from the individual rigs, and may be obtained from the historical rig and well data itself or from individual MC models as described above. Embodiments provide the ability to modify the global MC model per simulation run. These MC models control the movement of rigs into future wells. These MC models are also flexible in the sense that they can incorporate subject matter experts' preferences and experiences, which may be important when limited data is available in history about one of the well classes.

The example global MC model 200 shows thirteen red circles used to define well classes, labeled from 1 to 13. FIG. 8 provides information about the global MC model used in the dynamic modeling. The parameters used to define these classes are also displayed indicating five non-limiting parameters: location (onshore/offshore), fluid type (Oil/Gas), drilling operation (New, Re-entry/Workover), internal budget allocation information, and the type of the rig (e.g., drilling rig (DLG), coiled tubing operation (CT), and the like). A software program may present a graphical user interface (GUI) to the user for selection of the parameters to define the individual well classes.

Well Class #1, for instance, represents new gas wells located in the offshore. As mentioned previously, these well classes are defined by the user and can vary in each simulation run. The number on the arrows in FIG. 7 indicates how these well classes are connected. These numbers are obtained from historical records by tracking the movement of the rigs between these well classes. User experience and preference can be reflected into these MC models.

To illustrate how embodiments use these MC models, suppose a rig has just completed drilling a well, which is classified under Well Class #4 (offshore-oil-new), and the rig is ready to move to the next well. The developed solver scans all potential wells and assigns a transition probability to each one depending mainly on the well class of each potential well. For this example, the rig will first choose a well under the same well class, since it shows from history that rigs moved 4602 times between wells under Well Class #4. If the solver could not find a well under this class, the next option is to look for wells under Well Class #6 since it shows the second highest number of visits of 102 and so on. It is noted that the probability of a rig moving from one well class to another well class is calculated by dividing the number of times a rig moved between a particular well class to another individual well class by the total number of movements of rigs from the particular well class. In the example of Well Class #4, the probability of a rig moving to another well of Well Class #4 is 97.6%, the probability of a rig moving from a well of Well Class #4 to a well of Well Class #6 is 2.2% and the probability of a rig moving from a well of Well Class #4 to a well of Well Class #5 is 0.02%.

The global MC model 200 also shows that there is no way for a rig on the onshore location to visit an offshore well. This is demonstrated in FIG. 7 by the clear disconnection of Well Classes 1-6 and 7-13. As previously mentioned, the user can modify and customize these MC models as desired.

As described in more detail below, the global MC model 200 is used to assign rigs to futures wells of the business plan by a simulation used to generate the drilling schedule.

2. Specifying Rig Movement Priorities

Markov Chain models are not the only attributes that may influence how rigs move during simulation. In some embodiments, the user has the ability to add additional options in controlling the assignment of rigs to wells, which may become important when a rig has equal preference to more than one well.

Figure 9:
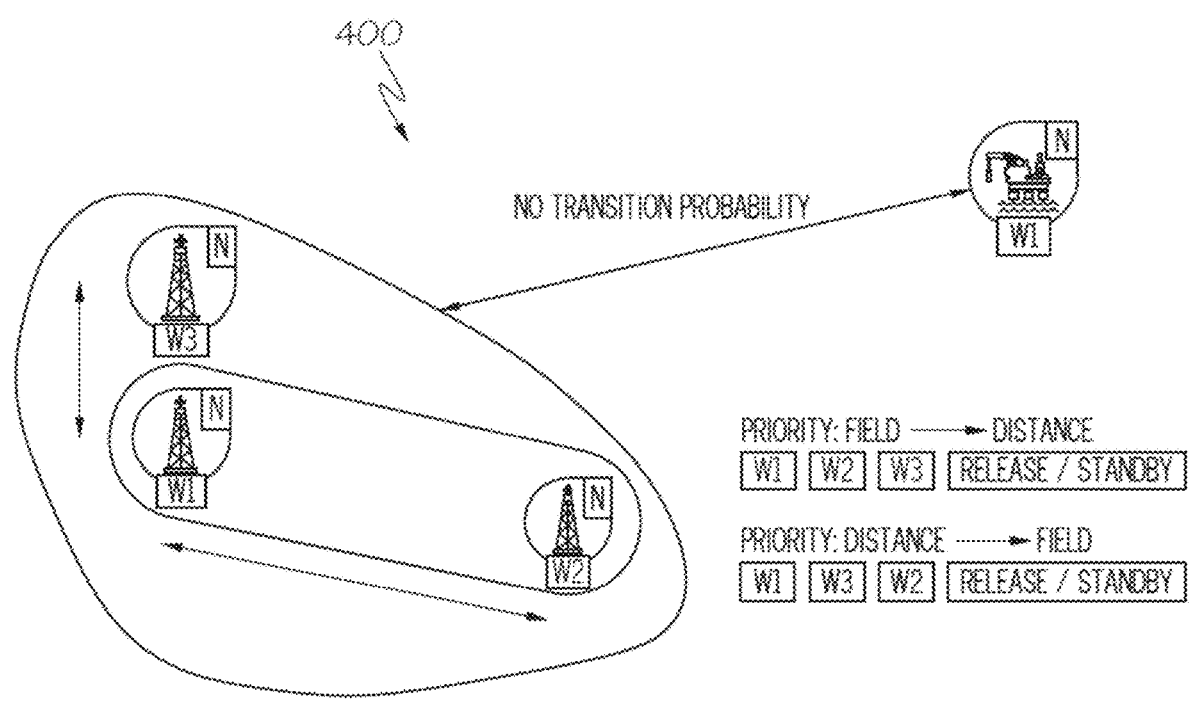
FIG. 9 schematically illustrates the use of priorities to control rig movement according to one or more embodiments described and illustrated herein.

Accordingly, in some embodiments, another set of conditions and priorities can be specified by the user, which may be beneficial when a rig has multiple wells under the same well class to choose from. FIG. 9 displays a schematic illustration of the ability of the user to add additional condition priorities, and how it affects the assignment of rigs during simulation.

As an example, assume there are four wells: W1 through W4, and two scenarios are made. As used herein, "scenario" refers to parameters that are applied for a simulation. In the first scenario, higher priorities are given to drill wells within the same field, before considering the distances between wells. In this case, a rig starting in W1 will move to W2 before W3 because they are within the same field (i.e., field X), even though the distance between W1 and W2 is longer than the distance between W1 and W3. In the second scenario, the priorities are changed and it is opted to consider shorter distances before changing the field. Now the rig, starting in W1, will move to W3 before W2. As mentioned previously, these priorities may be taken into consideration only for wells that have the same well class and share the same transition probability. In the example shown in FIG. 9, W4 will never be drilled from rigs starting in W1, W2, or W3.

The rig movement priorities may be set up considering many attributes (e.g., distance, field, year, well cost, well drill time . . . etc.). Embodiments are not limited by any particular priority rules.

Thus, the simulation may apply these user-defined priorities in conjunction with the MC model when assigning rigs to wells.

3. Initial Rig Information

In a third component, initial rig information is determined. Initial rig information refers to the number of rigs used as the start of the drilling schedule and their initial locations and capabilities. These parameters represent the initial conditions of the developed dynamic model and influences the generated schedule. In other words, to predict the movement of rigs at the start of a prediction period, the initial location of the rigs at the start of the prediction period should be known.

The drilling schedule that the embodiments of the present disclosure generates may be linked or bridged with the latest executed drilling schedule. To make logical and practical bridging between the two schedules, the logic of embodiments of the present disclosure determines which rigs to carry from history into prediction and after which well should the prediction start for each rig.

To determine which rigs to carry from history into prediction, the wells that are at the end of the current year, which is the year before the business plan, are analyzed. For example, if a rig is for a development drilling, then the rig is picked as development drilling rig. If not, then the rig is excluded.

As stated above, embodiments determine after which well should the prediction start for each rig. Drilling of some of the wells from the current year will be completed in the first year of the business plan, and some of the wells from the first year of the business plan will start drilling in the current year. In addition, in some cases wells from the first year's requirements will be completed in the current year. Therefore, this should be taken into consideration to avoid drilling additional wells or missing required wells.

The logic used in embodiments is based on a set of cutoff dates. Hence, the simulator starts by scanning the latest drilling schedule currently being implemented (i.e., current drilling schedule) and based on the cutoff dates, wells are either fixed in the business plan schedule as starting points or they are dropped. As a result, wells that are spudding beyond the cutoff dates are dropped and wells spudding ahead of the cutoff date are fixed (i.e., included in the simulation that creates the drilling schedule). However, if a well is spudding beyond the cutoff date and it is part of the business plan requirements, the well may be fixed in the business plan schedule.

The cutoff date is the date at which wells that are in the current schedule being implemented (e.g., the previous drilling schedule) will be used in the simulation to predict the new drilling schedule. Beyond the cutoff date is the start of the simulated prediction. For example, if a well is assigned to a particular rig from the latest drilling schedule (i.e., the current drilling schedule being implemented) but it will start drilling beyond the cutoff date, the well will not be included in the simulator and the simulator will predict a different, better-suited well.

Figure 10:
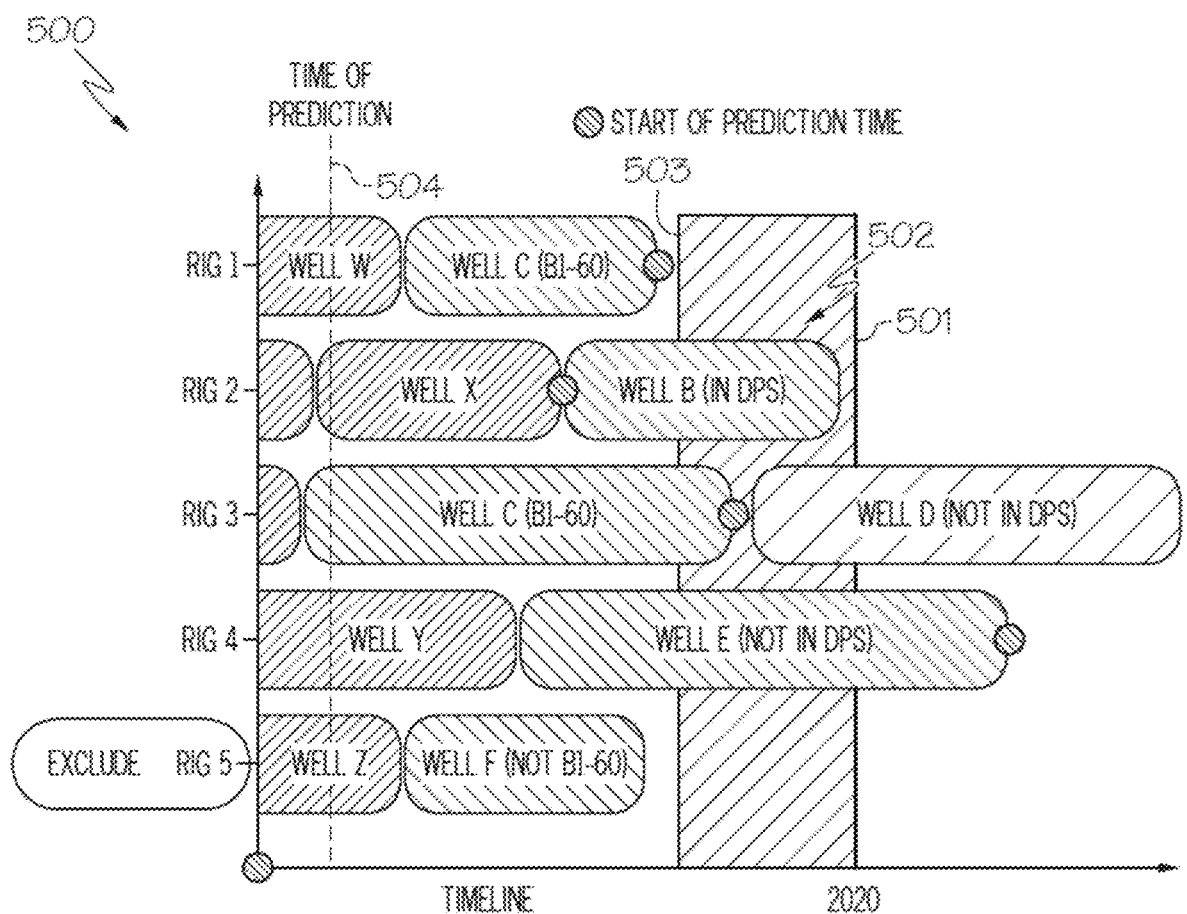
FIG. 10 graphically illustrates initial rig positionings according to one or more embodiments described and illustrated herein.

FIG. 10 demonstrates an example of how the logic operates with respect to initial rig positioning. In the illustrated embodiment, the time of the start of the business plan is indicated by line 501. A cutoff period 502 is the period of time when the cutoff dates will be assigned for a particular type of rig. FIG. 10 illustrates one cutoff period for all five illustrated rigs. The cutoff period can be customized to result in different cutoff dates depending on the type of wells.

The time of prediction (line 503) is the time where the simulation will start scanning wells and look for their end of drilling date to either: 1) assign wells after the current well (start of prediction) or 2) include the next well from the latest drilling schedule to the prediction based on the cutoff date and whether nor not the well will be in the business plan.

Rigs (1-4) are picked for development drilling scheduling (labeled BI-60 in FIG. 5) as the last well before the prediction cutoff date (line 503) is under well-type code BI-60. However, Rig 5 will not be considered, since the last well was from a different well type. The start of prediction time for each rig is indicated by the black dots. This means that the simulator will attempt to schedule the individual rigs after the black dots. Wells drilled by the individual rigs to the left of the black dots were previously scheduled in prior business plans or drilling schedules. For Rig 1, prediction will start after (Well A), which is a BI-60 well. At the time of prediction (i.e., the time when the simulation is run), Rig 1 is currently drilling Well W. The next well in the operating schedule is Well A, which is in the business plan for which the simulations are run to develop the drilling schedule. The prediction provided by the simulation will begin at the end of the drilling of Well A.

For Rig 2, it is currently drilling Well X at the time the prediction is run, and the prediction for Rig 2 will start at the spud date of Well B, which is part of the business plan requirements and is completed during the cutoff period 502.

For Rig 3, Well D will be dropped because it is not in the business plan (e.g., it doesn't meet the requirements of the business plan) and prediction will start after Well C. Thus, Rig 3 may be assigned a different well to drill that meets the business plan requirements.

Regarding Rig 4, it is drilling Well Y at the time the prediction is run. Prediction will start after Well E although Well E is not part of the business plan. However, since prediction occurs after the cutoff period 502 and the date of the start of the business plan (line 501), Well E will be completed and then the prediction for Rig 4 will occur after completion of Well E.

For Rig 5, it is drilling Well Z at the time of prediction. However, Well F, which is the next assigned well according to the prior drilling schedule, is not part of the business plan, and the simulation has no wells in the business plan for Rig 5 to drill. For example, the global MC model indicates a zero probability of assigning a rig-type similar to Rig 5 to a well in the business plan. Therefore, Rig 5 will be excluded from the drilling schedule.

For practicality and to account for the huge variation in well type and drilling durations, the cutoff dates are customizable. Assigning different cutoff periods for different types of wells based on the time it usually takes to drill a well will yield different cutoff dates. For example, it is possible to have different cutoff dates based on fluid type, shore type, filed, well type, etc. As a specific example, gas wells generally take longer to be drilled and completed than oil wells. Therefore, to start the prediction for rigs with different drilling objectives and capabilities, it is practical to have different cutoff dates to account for the time that these rigs take to complete a well, and to eliminate well completion variation prior to the start of the prediction. Moreover, sensitivity analysis can be run in a timely manner to identify the most realistic cutoff dates.

4. Adding/Releasing Rig Logics

In some embodiments, the capability to add future rigs or release existing rigs to and from the drilling schedule is provided. Particularly, this feature defines the implemented logics in adding new rigs when initial rigs cannot drill all needed wells of the business plan in a given year, and in releasing rigs when excessive number of rigs are available. Rig addition and release have slightly different requirements, both of which are described below.

Figure 11:
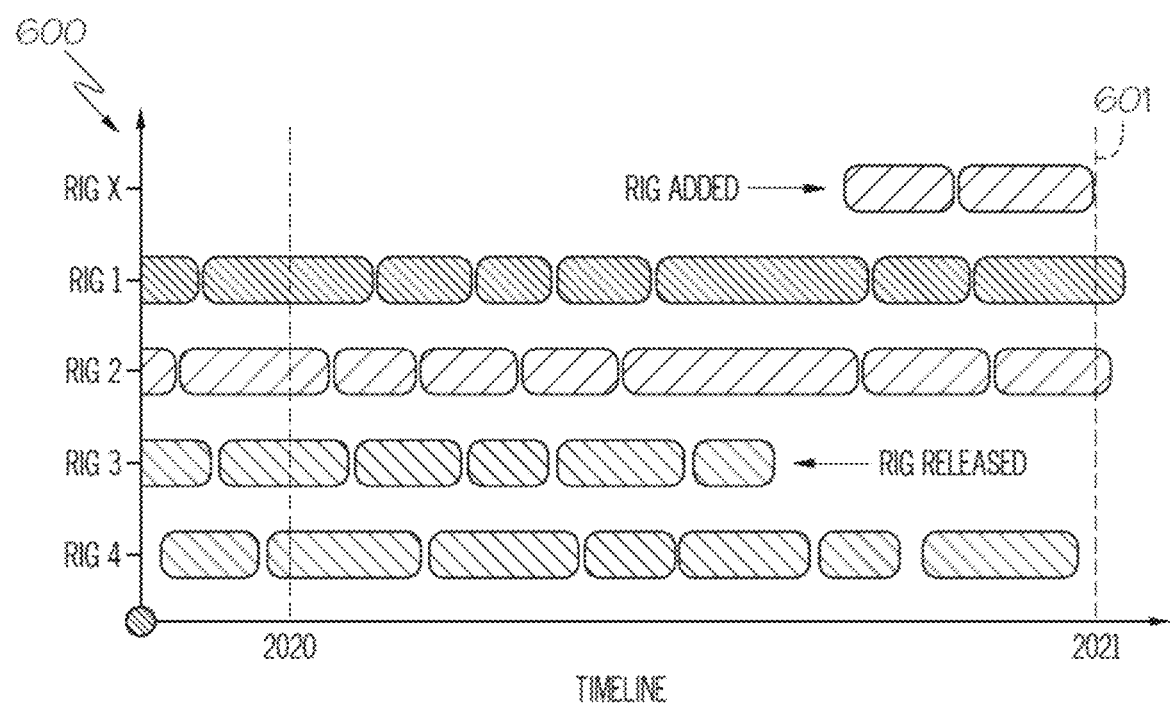
FIG. 11 graphically illustrates rig addition and rig release logic according to one or more embodiments described and illustrated herein.

Rig addition is used when the simulation determines that the number of rigs in the business is less than the number of rigs required to drill all the wells of the business plan within the predetermined period of time. Referring to FIG. 11, a chart 600 illustrating the scheduling for four rigs is schematically illustrated. Rig 1 is drilling wells of a first well class and complete all of its wells by the end of the business plan period indicated by line 601. However, Rig 2, which is drilling wells of a second well class, cannot complete all of its wells within the business plan period. Thus, another rig should be provided to complete the wells that Rig 2 cannot complete within the business plan time period.

The logic of the simulation gives priority to capitalize on existing resources as much as possible. The logic allows the simulator to scan wells and assign them to the existing rigs in the business plan. However, by the end of the prediction of each year in the plan some of the future wells are not found on the schedule for that year due to resource limitations. In this case, one or more rigs will be added. Referring again to FIG. 11, the simulation determines that a new Rig X must be added to complete the wells that Rig 2 cannot complete. The logic is such that it insures that any new rig starts from the right time in the year so it continues to the end of the year and continues throughout the descendent years. This feature ensures the avoidance of making gaps in the drilling schedule and/or illogical rig addition/releases activities. As shown in FIG. 11, Rig X is contracted to complete its wells at the end of the business plan period. It is noted that, if Rig 3 were drilling wells in the same well class as Rig 2, it would be moved to finish the wells of Rig 2 rather than adding Rig X.

Moreover, the logic allows the ability to set the maximum number of rigs to be added every year. This feature permits for resource management, sensitivities analysis and scenario planning. The rig cap feature is customizable, where new rigs are allowed or prohibited according to fluid type, shore type, field type, etc.

In the case of rig release, the situation is reversed where the number of available rigs is more than the number of rigs needed to drill all the wells of the business plan. In such cases, the logic of the simulation allows for the releasing of rigs. Referring again to FIG. 11, Rig 3 and Rig 4 are drilling wells of the same well class. However, Rig. 3 will be completed with its assigned wells before the end of the business plan period. The simulation does not have any more wells to assign Rig 3 after completion. For example, the global MC model indicates a zero probability of assigning Rig 3 to any wells of the same well class. In this case, Rig. 3 is released after drilling its final well.

However, there are some exceptions. For example, in some cases a rig needs to be released toward the end of the year, but, by looking at the next year's requirement, this rig is needed or an equivalent rig will be contracted. In such a case, the logic allows the rig to continue drilling wells from the next year. This logic allows the ability to avoid illogical rig releases since releasing a rig that needs to be replaced in five or six months is impractical.

5. Simulation and Drilling Schedule Output

Once all simulation parameters are specified, simulations are ready to launch. Embodiments enable a detailed drilling scheduling for a three-year business plan to be produced within minutes or even less than a minute.

The simulation is performed using the user-preferences for the MC model, the rig movement priorities, initial rig location information, adding/removing rig parameters, and any other specified user parameters. For each simulation forecast, the output file contains all specifications set by the user, including maximum number of additional rigs that is allowed to be added per year, the rig stopping date in gas and oil wells, in addition to the cutoff dates for releasing rigs. FIG. 12 shows an example of simulation parameters used in one of the simulations. In FIG. 12, the parameters are user-defined inputs, and embodiments offer the flexibility of varying the parameters in every run. The non-limiting example parameters include simulation start year, simulation end year, global multiplier to well cost, global multiplier to well drill time, maximum number of rigs added for various years of the simulation period, rig starting/stopping month and day in gas and oil wells, released rigs cut-off month, and released rigs cut-off day. It is noted that the global multiplier to well cost and the global multiplier to well drill time are to account for higher cost and time or lower cost and time to increase or decrease the estimated time and cost taken to drill future wells. These parameters may be set to run any correction required in the case of an overestimate of the cost and time where a less than 1 multiplier can be applied or underestimate of the cost and time where a higher than 1 multiplier can be applied.

The released rigs cut-off month and released rigs cut-off day sets the date wherein any rig that is completed with no additional wells assigned before this date is released. For example, any rig that is finished drilling its wells before Jul. 1, 2024 and has no additional wells to drill will be released from the drilling schedule.

When the simulation is run, the initial rig location information is analyzed as stated above. Then, the global MC model is referenced to determine probabilities for moving rigs from well to well. The logic assigns rigs to the wells matching a well class having the highest probability according to the global MC model. Further, user preferences are also accessed to ensure that user-defined preferences and rules are followed when assigning rigs. Rigs are added and dropped from the drilling schedule according to the rig addition/removal logic as described above.

The simulation creates standardized output files for each simulation case. As an example and not a limitation, the standardized output contains the following example files for each simulation case:
 Drilling schedule plot
 Markov-Chain plot
 Rig-year plot
 Well count plot
 Detailed Output file summarizing the events of the dynamic modeling
 Tabulated drilling schedule in Excel format
 The drilling schedule plot contains the drilling schedule and sequence for all rigs in one view.

The drilling schedule plot may be detailed enough to demonstrate the following non-limiting information:
 Rig Name
 Well Name
 Shore Type
 Well Type
 Well Objective (e.g., producer well, injector well, observation well, water supply well, evaluation well, etc.)

Figure 13A:
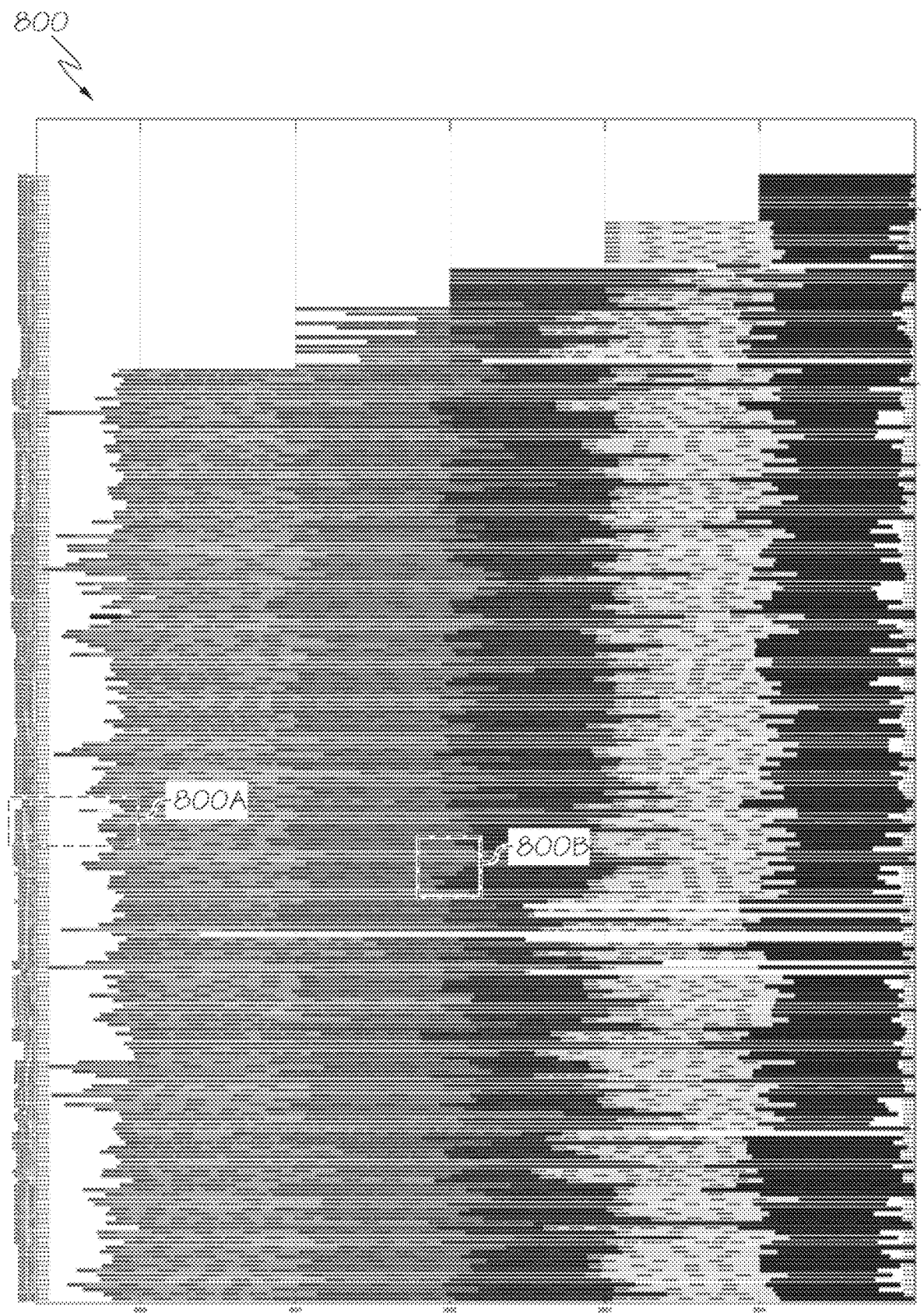
FIG. 13A illustrates an example five year drilling schedule plot for a plurality of rigs according to one or more embodiments described and illustrated herein.

FIG. 13A illustrates an example drilling schedule for a five-year business plan. The x-axis is time and the y-axis lists all of the rigs of the business plan. The example drilling schedule includes hundreds of rigs and hundreds of wells. The wells are represented by the colored bars extending on the x-axis. Some drilling schedules may include thousands of rigs and wells.

The bars representing the wells may be color-coded to represent the targeted year for drilling. As a non-limiting example, wells targeted to be drilled in 2021 may be green in color. It is noted that wells having a targeted year may be drilled partially in the previous year and/or the year after the targeted year depending on the schedule. However, the color coding may provide the user with a quick glance at the drilling activity in a given year.

Figure 13B:
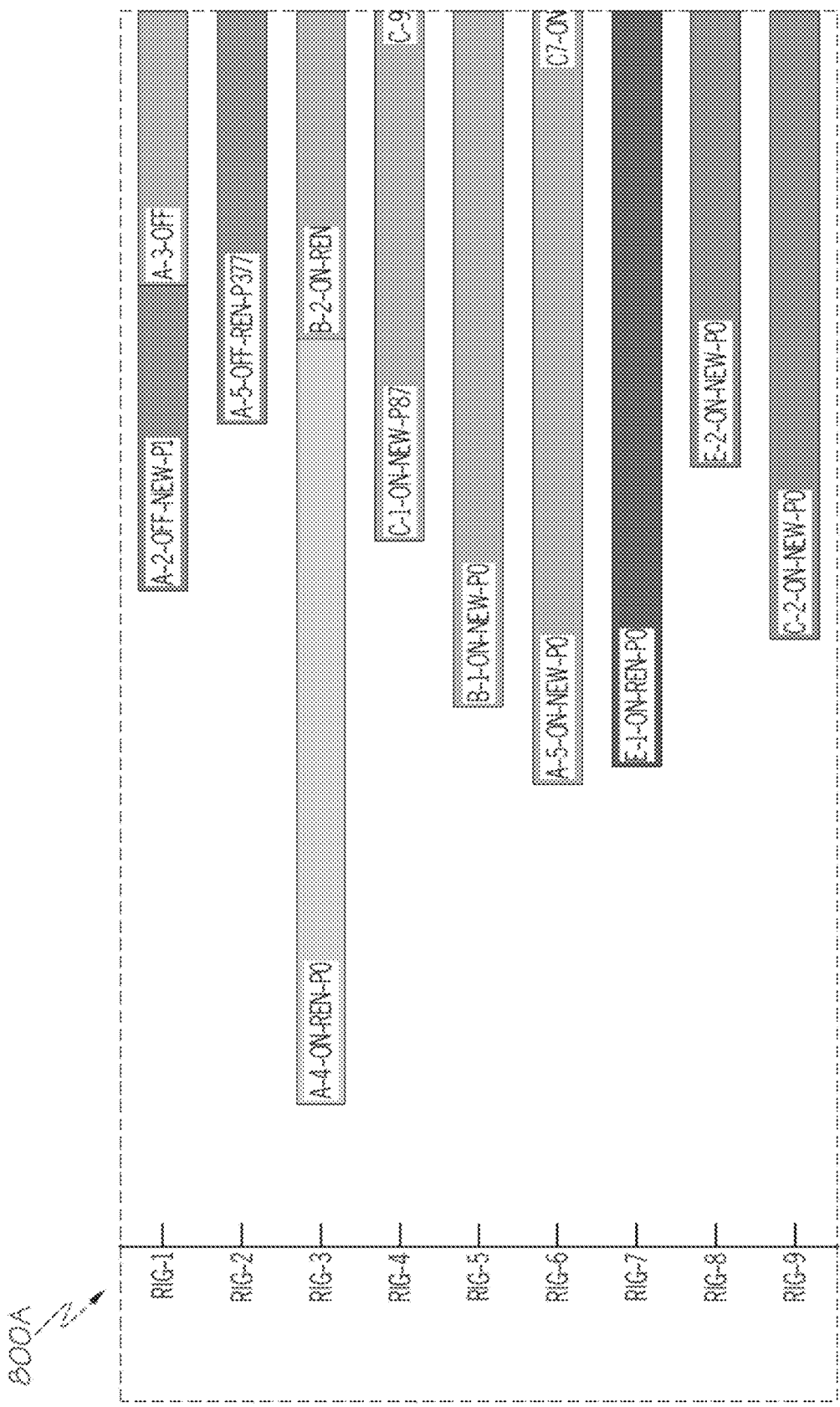
FIG. 13B illustrates an example rig names on an example drilling schedule according to one or more embodiments described and illustrated herein.
Figure 13C:
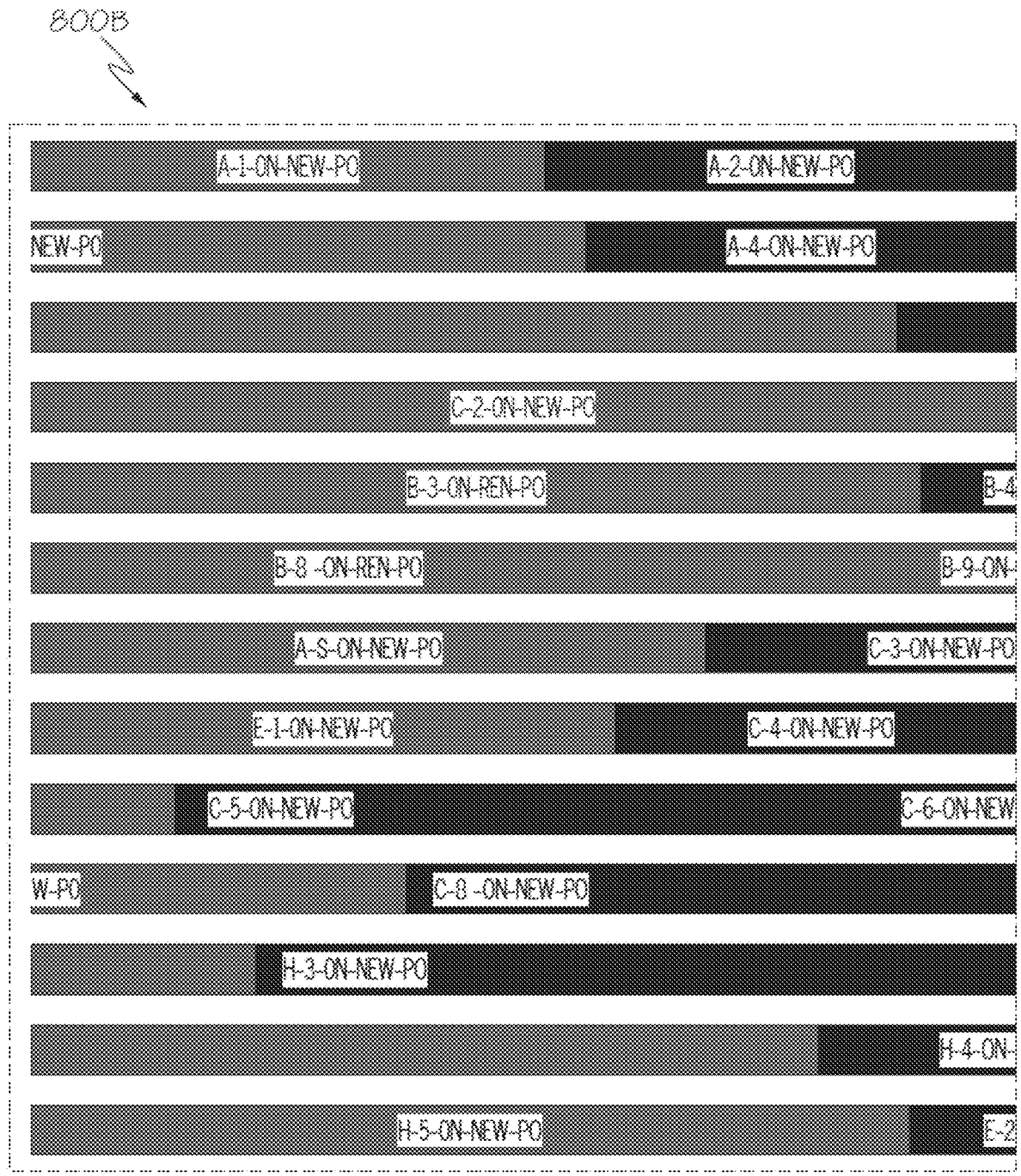
FIG. 13C illustrates an example well information on an example drilling schedule plot according to one or more embodiments described and illustrated herein.

FIG. 13B shows a zoomed-in portion 800A of the drilling schedule 800 and illustrates some rig names on the drilling schedule 800. In the illustrated example, each bar includes information about a well or a number of wells for the given targeted year. FIG. 13C shows a zoomed-in portion 800B of the drilling schedule 800 near a transition between the year 2021 and the year 2022. As shown in FIG. 13C, each bar may include multiple wells. Thus, in these cases, a rig will drill multiple wells in one year.

The drilling schedule may then be used to deploy and schedule rigs to extract hydrocarbons from the wells of the business plan.

6. Budgeting Forecasts

In some embodiments, budgeting forecasts are computed using the drilling schedules. These budget forecasts may be used to estimate cost and rig level requirements per year. As a non-limiting example, the following equations may be used to determine an annual budget:

Total drilling cost in year $(j) =$ $$\sum_{i=1}^{n} \left( \frac{\text{Partial drill time of well }(i) \text{ in year }(j)}{\text{Total drill time of well }(i)} \right) *$$

Total drilling cost of well $(i)$ where n is the total number of wells drilled fully or partly in year (j). As shown in FIG. 13B, some wells are drilled over the course of two years. Thus, according to the equation above, only the portion drilled in a specific year is applied to that specific year. This budget forecast may be helpful in business planning for future years.

Figure 14:
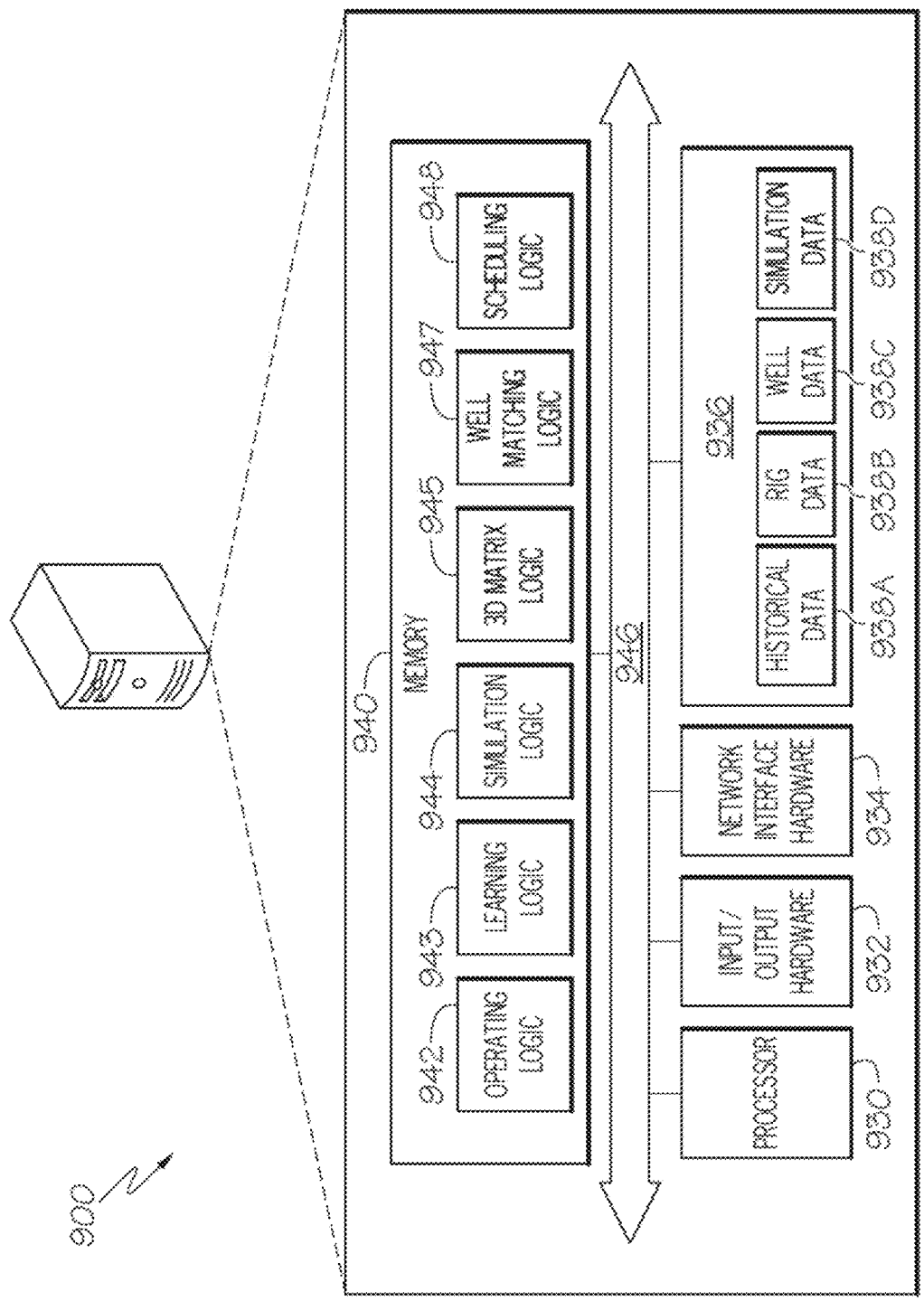
FIG. 14 illustrates and example computing device for generating a drilling schedule according to one or more embodiments described and illustrated herein.

Embodiments of the present disclosure may be implemented by a computing device, and may be embodied as computer-readable instructions stored on a non-transitory memory device. FIG. 14 depicts an example computing device 900 configured to perform the functionalities described herein. The example computing device 900 provides a system for generating drilling schedules and budgeting forecasts, and/or a non-transitory computer usable medium having computer readable program code for generating drilling schedules and budgeting forecasts embodied as hardware, software, and/or firmware, according to embodiments shown and described herein. While in some embodiments, the computing device 900 may be configured as a general purpose computer with the requisite hardware, software, and/or firmware, in some embodiments, the computing device 900 may be configured as a special purpose computer designed specifically for performing the functionality described herein. It should be understood that the software, hardware, and/or firmware components depicted in FIG. 14 may also be provided in other computing devices external to the computing device 900 (e.g., data storage devices, remote server computing devices, and the like).

As also illustrated in FIG. 14, the computing device 900 (or other additional computing devices) may include a processor 930, input/output hardware 932, network interface hardware 934, a data storage component 936 (which may store historical data 938 (e.g., historical well data and historic rig data), business plan rig data 938B, business plan well data 938C, simulation data 938D (data for executing the simulations described herein) and any other data), and a non-transitory memory component 940. The memory component 940 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 940 may be configured to store operating logic 942, learning logic 943, and simulation logic 944 (each of which may be embodied as computer readable program code, firmware, or hardware, as an example). A local interface 946 is also included in FIG. 14 and may be implemented as a bus or other interface to facilitate communication among the components of the computing device 900.

The processor 930 may include any processing component configured to receive and execute computer readable code instructions (such as from the data storage component 936 and/or memory component 940). The input/output hardware 932 may include a graphics display device, keyboard, mouse, printer, camera, microphone, speaker, touch-screen, and/or other device for receiving, sending, and/or presenting data. The network interface hardware 934 may include any wired or wireless networking hardware, such as a modem, LAN port, wireless fidelity (Wi-Fi) card, WiMax card, mobile communications hardware, and/or other hardware for communicating with other networks and/or devices, such as to receive the historical data 938A from various sources, for example.

It should be understood that the data storage component 936 may reside local to and/or remote from the computing device 900, and may be configured to store one or more pieces of data for access by the computing device 900 and/or other components. As illustrated in FIG. 14, the data storage component 936 may have historical data 938A, which in at least one embodiment includes historic rig data and historical well data. The historical data 938A may be stored in one or more data storage devices. Similarly, business plan rig data 938B and business plan well data 938C may be stored by the data storage component 936 and may include information relating to the rigs (e.g., rig number, rig capabilities, etc.) and the wells (e.g., well class, well type, well parameters, etc.) of the current business plan. In another embodiment, the computing device 900 may be coupled to a remote server or other data storage device that stores the relevant data. Other data to perform the functionalities described herein may also be stored in the data storage component 936 (e.g., initial rig location information and prior drilling schedules).

Included in the memory component 940 may be the operating logic 942, the learning logic 943, the simulation logic 944, the three-dimensional matrix logic 945, the well matching logic, and the scheduling logic 947. The operating logic 942 may include an operating system and/or other software for managing components of the computing device 900. The operating logic 942 may also include computer readable program code for displaying the graphical user interface used by the user to input parameters and review results of the simulations. Similarly, the learning logic 943 may reside in the memory component 940 and may be configured to facilitate generation of the MC models described above to learn the movements of the rigs of the business plan. The simulation logic 944 may be configured to run the simulations described herein to generate the scenario outputs. The three-dimensional matrix logic 945 is used to create the three-dimensional matrices and plots described herein. The well matching logic 947 is used to find one or more matched historic wells that are similar to prospective wells of a business plan, and to calculate estimated well parameters using the matched historic wells. The scheduling logic 948 is used to create the drilling schedules according to the methods described herein.

The components illustrated in FIG. 14 are merely exemplary and are not intended to limit the scope of this disclosure. More specifically, while the components in FIG. 14 are illustrated as residing within the computing device 900, this is a non-limiting example. In some embodiments, one or more of the components may reside external to the computing device 900.

It should now be understood that embodiments of the present disclosure are directed to systems and methods for calculating drill time and cost estimates for prospective wells of a business plan. Historic data corresponding to well attributes from historic wells are analyzed. Particularly, historic wells are automatically scanned to search for historic wells that match the attributes for the prospective wells in the development plan. Then, for each prospective well in the business plan, a group of similar historic wells are identified. The identified group of historic wells is used to calculate well parameters that may be used to perform downstream processes, such as calculating drilling schedules and budget forecasts.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method of moving a plurality of rigs between wells, the method comprising:
   receiving historical well data regarding individual well types and historical rig data regarding individual rigs;
   generating a Markov Chain model from the historical well data and the historical rig data, wherein:
      the Markov Chain model comprises a plurality of states and a plurality of links between states;
      each state of the plurality of states is a well class derived from the historical well data; and
      each link indicates a number of rigs that traveled between individual well classes;
   determining, using the Markov Chain model, a probability of rigs moving between individual well classes;
   predicting movement of individual rigs of the plurality of rigs between future wells based at least in part on the Markov Chain model;
   generating near-term, mid-term, and long-term drilling schedules for the plurality of rigs based at least in part on the predicted movement of the individual rigs;
   moving the plurality of rigs to the wells according to the near-term, mid-term, and long-term drilling schedules; and
   drilling the wells using the plurality of rigs according to the near-term, mid-term, and long-term drilling schedules,
   wherein the near-term, mid-term, and long-term drilling schedules account for costs of securing the plurality of rigs to drill the future wells, a net present value of at least one of the future wells, cumulative production of at least one of the future wells, or combinations thereof.

2. The method of claim 1, further comprising deploying the plurality of rigs according to the predicted rig movement.

3. The method of claim 1, wherein:
   the Markov Chain model comprises a plurality of well classes corresponding to the plurality of states; and
   each well class of the plurality of well classes is defined by one or more well attributes.

4. The method of claim 3, wherein the one or more well attributes comprises one or more of: shore type, fluid type, drilling operation, and well type.

5. The method of claim 1, further comprising receiving the one or more well attributes from a user.

6. The method of claim 1, further comprising receiving one or more rig movement priorities, wherein the predicting movement of individual rigs of the plurality of rigs moving between future wells is further based at least in part on the one or more rig movement priorities.

7. The method of claim 1, further comprising receiving initial rig information for the plurality of rigs, wherein the predicting movement of individual rigs of the plurality of rigs moving between future wells is further based at least in part on the initial rig information.

8. A method of drilling wells, the method comprising:
   receiving historical well data regarding individual well types and historical rig data regarding individual rigs;
   generating a Markov Chain model from the historical well data and the historical rig data, wherein:
      the Markov Chain model comprises a plurality of states and a plurality of links between states;

each state of the plurality of states is a well class derived from the historical well data; and each link indicates a number of rigs that traveled between individual well classes;

determining, using the Markov Chain model, a probability of rigs moving between individual well classes;

predicting movement of individual rigs of a plurality of rigs between future wells based at least in part on the Markov Chain model;

generating near-term, mid-term, and long-term drilling schedules for the plurality of rigs based at least in part on the predicted movement of the individual rigs; and drilling the wells using the plurality of rigs according to the near-term, mid-term, and long-term drilling schedules, wherein the near-term, mid-term, and long-term drilling schedules account for costs of securing the plurality of rigs to drill the plurality of wells, a net present value of at least one of the plurality of wells, cumulative production of at least one of the plurality of well, or combinations thereof.

9. The method of claim 8, wherein:
the Markov Chain model comprises a plurality of well classes corresponding to the plurality of states; and
each well class of the plurality of well classes is defined by one or more well attributes.

10. The method of claim 9, wherein the one or more well attributes comprises one or more of: shore type, fluid type, drilling operation, and well type.

11. The method of claim 9, further comprising receiving the one or more well attributes from a user.

12. The method of claim 8, further comprising receiving one or more rig movement priorities, wherein the predicting movement of individual rigs of the plurality of rigs moving between future wells is further based at least in part on the one or more rig movement priorities.

13. The method of claim 8, further comprising receiving initial rig information for the plurality of rigs, wherein the predicting movement of individual rigs of the plurality of rigs moving between future wells is further based at least in part on the initial rig information.

14. The method of claim 8, further comprising updating the drilling schedule by adding a new rig to the drilling schedule when at least one future well is not included within the drilling schedule.

15. The method of claim 8, further comprising removing a rig from the drilling schedule after completion of a last well when a probability of moving the rig to a new well is zero based on the Markov Chain model.

16. The method of claim 8, further comprising calculating a budget forecast from the drilling schedule.

17. A system for moving a plurality of rigs between wells, the system comprising:
the plurality of rigs;
one or more processors; and
a non-transitory computer-readable memory storing instructions that, when executed by the one or more processors, causes the one or more processors to:
receive historical well data regarding individual well types and historical rig data regarding individual rigs;
generate a Markov Chain model from the historical well data and the historical rig data, wherein:
the Markov Chain model comprises a plurality of states and a plurality of links between states;
each state of the plurality of states is a well class derived from the historical well data; and
each link indicates a number of rigs that traveled between individual well classes;
determine, using the Markov Chain model, a probability of rigs moving between individual well classes;
predict movement-of individual rigs of the plurality of rigs between future wells based at least in part on the Markov Chain model;
generate near-term, mid-term, and long-term drilling schedules for the plurality of rigs based at least in part on the predicted movement of the individual rigs;
move the plurality of rigs to the wells according to the near-term, mid-term, and long-term drilling schedules, and
drill the wells using the plurality of rigs according to the near-term, mid-term, and long-term drilling schedules,
wherein the near-term, mid-term, and long-term drilling schedules account for costs of securing the plurality of rigs to drill the future wells, a net present value of at least one of the future wells, cumulative production of at least one of the future wells, or combinations thereof.

18. The system of claim 17, further comprising deploying the plurality of rigs according to the predicted rig movement.

19. The system of claim 17, wherein:
the Markov Chain model comprises a plurality of well classes corresponding to the plurality of states; and
each well class of the plurality of well classes is defined by one or more well attributes.

20. The system of claim 17, further comprising receiving one or more rig movement priorities, wherein the predicting movement of individual rigs of the plurality of rigs moving between future wells is further based at least in part on the one or more rig movement priorities.

* * * * *